(12) United States Patent
Ikeda

(10) Patent No.: US 11,322,762 B2
(45) Date of Patent: May 3, 2022

(54) FUEL CELL SYSTEM

(71) Applicant: TOYOTA JIDOSHA KABUSHIKI KAISHA, Toyota (JP)

(72) Inventor: Koichiro Ikeda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/032,478

(22) Filed: Sep. 25, 2020

(65) Prior Publication Data

US 2021/0143459 A1    May 13, 2021

(30) Foreign Application Priority Data

Nov. 11, 2019    (JP) .............................. JP2019-204045

(51) Int. Cl.
| | | |
|---|---|---|
| *H01M 8/04* | (2016.01) | |
| *H01M 8/04746* | (2016.01) | |
| *H01M 8/04089* | (2016.01) | |
| *H01M 8/04701* | (2016.01) | |
| *H01M 8/04858* | (2016.01) | |

(52) U.S. Cl.
CPC ... *H01M 8/04753* (2013.01); *H01M 8/04089* (2013.01); *H01M 8/04708* (2013.01); *H01M 8/04902* (2013.01); *H01M 8/04932* (2013.01); *H01M 2250/20* (2013.01)

(58) Field of Classification Search
CPC ......... H01M 8/04753; H01M 8/04746; H01M 8/04089; H01M 8/04104; H01M 8/04708; H01M 8/04731; H01M 8/0491; H01M 8/04902; H01M 8/04932; H01M 8/0494; H01M 2250/20
See application file for complete search history.

(56) References Cited

U.S. PATENT DOCUMENTS

| | | | | |
|---|---|---|---|---|
| 7,282,288 | B2 * | 10/2007 | Yoshizawa | ......... H01M 8/04119 |
| | | | | 429/414 |
| 9,343,762 | B2 * | 5/2016 | Jeon | .................... H01M 8/0438 |
| 9,728,798 | B2 * | 8/2017 | Wake | ................ H01M 8/04303 |

FOREIGN PATENT DOCUMENTS

| | | |
|---|---|---|
| JP | 2016-031841 A | 3/2016 |
| JP | 2018-147727 A | 9/2018 |

\* cited by examiner

*Primary Examiner* — Raymond Alejandro
(74) *Attorney, Agent, or Firm* — Finnegan, Henderson, Farabow, Garrett & Dunner, LLP

(57) ABSTRACT

A fuel cell system includes first and second fuel cells each generating electric power using fuel gas and oxidant gas, first and second fuel gas supply devices supplying the fuel gas, first and second circulation paths circulating the discharged fuel gas to the first and second fuel cells, a communication path communicated with the first and second circulation paths, an opening/closing device causing the first and second circulation path to be communicated or to be disconnected by opening/closing the communication path, and a controller configured to determine whether there is a possibility of flooding, and when determining that there is the possibility of flooding, suspend power generation of one of the first and second fuel cells while maintaining supply of the fuel gas, and cause the opening/closing device to make the first and second circulation paths be communicated with each other.

17 Claims, 14 Drawing Sheets

FUEL CELL SYSTEM

CROSS-REFERENCE TO RELATED APPLICATION

This application is based upon and claims the benefit of priority of the prior Japanese Patent Application No. 2019-204045, filed on Nov. 11, 2019, the entire contents of which are incorporated herein by reference.

FIELD OF THE INVENTION

The present disclosure relates to a fuel cell system.

BACKGROUND

For example, there is a fuel cell system including a circulation path that recirculates fuel gas after being used for the power generation to a plurality of fuel cell stacks as disclosed in, for example, Japanese Patent Application Publication No. 2018-147727.

SUMMARY OF THE INVENTION

For example, when a large amount of liquid water produced through power generation collects in the circulation path, and the circulation amount of the fuel gas is insufficient with respect to the amount of the liquid water, it is difficult to cause the liquid water to flow out. Thus, clogging of the circulation path with the liquid water may occur, thereby causing flooding in the fuel cell. When flooding occurs, catalyst-carrying carbon is oxidized by the liquid water and eluted at the electrode of the fuel cell, for example, and power generation performance may deteriorate.

By increasing the amount of fuel gas supplied to each fuel cell stack, the circulation amount increases, and thereby, occurrence of flooding is inhibited. However, when the fuel gas of which the amount is greater than the supply amount necessary for power generation is supplied to each fuel cell stack, the fuel gas is wasted, and thereby, fuel economy may be lowered.

It is therefore an object of the present disclosure to provide a fuel cell system capable of reducing consumption of the fuel gas and inhibiting occurrence of flooding.

The above object is achieved by a fuel cell system including: a first fuel cell and a second fuel cell, each generating electric power using fuel gas and oxidant gas; a first fuel gas supply device that supplies the first fuel cell with the fuel gas; a second fuel gas supply device that supplies the second fuel cell with the fuel gas; a first circulation path that circulates the fuel gas discharged from the first fuel cell to the first fuel cell; a second circulation path that circulates the fuel gas discharged from the second fuel cell to the second fuel cell; a communication path that is communicated with the first circulation path and the second circulation path; an opening/closing device that causes the first circulation path and the second circulation path to be communicated with each other or to be disconnected from each other by opening/closing the communication path; and a controller configured to control the first fuel cell and the second fuel cell, the first fuel gas supply device and the second fuel gas supply device, and the opening/closing device, wherein the controller is configured to: determine whether there is a possibility of occurrence of flooding in the first fuel cell and the second fuel cell due to power generation of the first fuel cell and the second fuel cell, and when determining that there is the possibility of occurrence of flooding in the first fuel cell and the second fuel cell, suspend power generation of one of the first fuel cell and the second fuel cell while maintaining supply of the fuel gas, and cause the opening/closing device to make the first circulation path and the second circulation path be communicated with each other.

In the above configuration, the controller determines whether there is a possibility of occurrence of flooding in the first and second fuel cells due to power generation of the first and second fuel cells, and when determining that there is the possibility of occurrence of flooding in the first and second fuel cells, suspends power generation of one of the first and second fuel cells while maintaining supply of the fuel gas, and causes the opening/closing device to make the first and second circulation paths be communicated with each other. Thus, the fuel gas flows from the circulation path of the one of the first and second fuel cells to the circulation path of the other of the first and second fuel cells through the communication path. Therefore, liquid water collecting in the circulation path of the other of the first and second fuel cells is discharged due to the increase in the flow rate of the fuel gas, and occurrence of flooding in the other of the first and second fuel cells is inhibited. In addition, since the power generation of the one of the first and second fuel cells is suspended, liquid water is not produced, and occurrence of flooding is inhibited.

In addition, the other of the first and second fuel cells can increase generated electric power such that the decline in generated electric power due to the suspension of the power generation of the one of the first and second fuel cells using the fuel gas flowing from the circulation path of the one of the first and second fuel cells to the circulation path of the other of the first and second fuel cells through the communication path when the first and second circulation paths are communicated with each other. Thus, the fuel gas is inhibited from being wasted without being used for power generation.

In the above configuration, when the power generation of the one of the first fuel cell and the second fuel cell is suspended, the other of the first fuel cell and the second fuel cell may increase generated electric power by a decline in generated electric power due to suspension of the power generation of the one of the first fuel cell and the second fuel cell.

In the above configuration, the fuel cell system may further include: a first oxidant gas supply device that supplies the first fuel cell with the oxidant gas; and a second oxidant gas supply device that supplies the second fuel cell with the oxidant gas, and the controller may be configured to, when determining that there is the possibility of occurrence of flooding in the first fuel cell and the second fuel cell, cause an oxidant gas supply device, which supplies the oxidant gas to the other of the first fuel cell and the second fuel cell, of the first oxidant gas supply device and the second oxidant gas supply device to increase a supply amount of the oxidant gas.

In the above configuration, the controller may be configured to, when determining that there is the possibility of occurrence of flooding in the first fuel cell and the second fuel cell, cause another oxidant gas supply device, which supplies the oxidant gas to the one of the first fuel cell and the second fuel cell, of the first oxidant gas supply device and the second oxidant gas supply device to reduce supply of the oxidant gas to suspend the power generation of the one of the first fuel cell and the second fuel cell.

In the above configuration, the fuel cell system may further include: a first oxidant gas supply device that supplies the oxidant gas to the first fuel cell; and a second oxidant gas supply device that supplies the oxidant gas to the second fuel cell, and the controller may be configured to, when determining that there is the possibility of occurrence of flooding in the first fuel cell and the second fuel cell, cause an oxidant gas supply device, which supplies the oxidant gas to the one of the first fuel cell and the second fuel cell, of the first oxidant gas supply device and the second oxidant gas supply device to reduce supply of the oxidant gas to suspend the power generation of the one of the first fuel cell and the second fuel cell.

In the above configuration, the fuel cell system may further include: a first circulation valve that is disposed in the first circulation path on a downstream side of a part where the first circulation path and the communication path are connected to each other; and a second circulation valve that is disposed in the second circulation path on a downstream side of a part where the second circulation path and the communication path are connected to each other, and the controller may be configured to close a circulation valve, which is disposed in a circulation path of the one of the first fuel cell and the second fuel cell, of the first circulation valve and the second circulation valve when causing the opening/closing device to make the first circulation path and the second circulation path be communicated with each other.

In the above configuration, the controller may be configured to determine that there is a possibility of occurrence of flooding in the first fuel cell and the second fuel cell when an output current required of the first fuel cell and an output current required of the second fuel cell are less than a threshold value.

In the above configuration, the fuel cell system may further comprise: a first measurement device that measures a temperature of the first fuel cell; and a second measurement device that measures a temperature of the second fuel cell, and wherein the controller may be configured to determine that there is a possibility of occurrence of flooding in the first fuel cell and the second fuel cell when the temperature measured by the first measurement device or the temperature measured by the second measurement device is equal to or less than a temperature reference value.

In the above configuration, the controller may be configured to determine the temperature reference value according to the output current required of the first fuel cell and the second fuel cell.

In the above configuration, the fuel cell system may further include: a first detection device that detects a pressure loss of the fuel gas flowing through the first fuel cell; and a second detection device that detects a pressure loss of the fuel gas flowing through the second fuel cell, and the controller may be configured to determine a pressure reference value according to an output current required of the first fuel cell and an output current required of the second fuel cell, and when the pressure loss detected by the first detection device or the pressure loss detected by the second detection device is greater than a pressure reference value, determine that there is a possibility of occurrence of flooding in the first fuel cell and the second fuel cell.

In the above configuration, the fuel cell system may further include: a first measurement device that measures a temperature of the first fuel cell; and a second measurement device that measures a temperature of the second fuel cell, and the controller may be configured to determine the pressure reference value according to the temperature measured by the first measurement device or the temperature measured by the second measurement device, and the output current.

In the above configuration, the controller may be configured to suspend power generation of a fuel cell of which an accumulated power generation time is longer of the first fuel cell and the second fuel cell when determining that there is the possibility of occurrence of flooding in the first fuel cell and the second fuel cell.

In the above configuration, the controller may be configured to: determine whether there is a possibility of occurrence of flooding in the other of the first fuel cell and the second fuel cell when the other of the first fuel cell and the second fuel cell is to generate electric power while the power generation of the one of the first fuel cell and the second fuel cell is suspended, and when there is no possibility of occurrence of flooding in the other of the first fuel cell and the second fuel cell, suspend the power generation of the one of the first fuel cell and the second fuel cell.

In the above configuration, when there is a possibility of occurrence of flooding in the other of the first fuel cell and the second fuel cell, the first fuel gas supply device and the second fuel gas supply device may be caused to increase a supply amount of the fuel gas.

In the above configuration, the fuel cell system may further include: a first ejector that is connected to the first circulation path, and guides the fuel gas discharged from the first fuel cell to the first fuel cell together with the fuel gas supplied from the first fuel gas supply device; and a second ejector that is connected to the second circulation path, and guides the fuel gas discharged from the second fuel cell to the second fuel cell together with the fuel gas supplied from the second fuel gas supply device.

In the above configuration, the fuel cell system may further include: a third fuel cell that generates electric power using the fuel gas and the oxidant gas; a third fuel gas supply device that supplies the fuel gas to the third fuel cell; and a third circulation path that circulates the fuel gas discharged from the third fuel cell to the third fuel cell, the communication path may be communicated with the first circulation path, the second circulation path, and the third circulation path, the opening/closing device may cause the first circulation path, the second circulation path, and the third circulation path to be communicated with each other, or to be disconnected from each other, and the controller may be configured to: determine whether there is a possibility of occurrence of flooding in the first fuel cell, the second fuel cell, and the third fuel cell due to power generation of the first fuel cell, the second fuel cell, and the third fuel cell, when determining that there is the possibility of occurrence of flooding in the first fuel cell, the second fuel cell, and the third fuel cell, suspend the power generation of the one of the first fuel cell and the second fuel cell among the first fuel cell, the second fuel cell, and the third fuel cell while maintaining supply of the fuel gas, and cause the first circulation path, the second circulation path, and the third circulation path to be communicated with each other.

In the above configuration, the controller may be configured to, when determining that there is the possibility of occurrence of flooding in the first fuel cell, the second fuel cell, and the third fuel cell, suspend the power generation of the one of the first fuel cell and the second fuel cell and power generation of the third fuel cell while maintaining supply of the fuel gas, and cause the first circulation path, the second circulation path, and the third circulation path to be communicated with each other.

Effects of the Invention

According to the present disclosure, it is possible to provide a fuel cell system capable of reducing consumption of the fuel gas and inhibiting occurrence of flooding.

DETAILED DESCRIPTION

[Configuration of Fuel Cell System]

Figure 1:
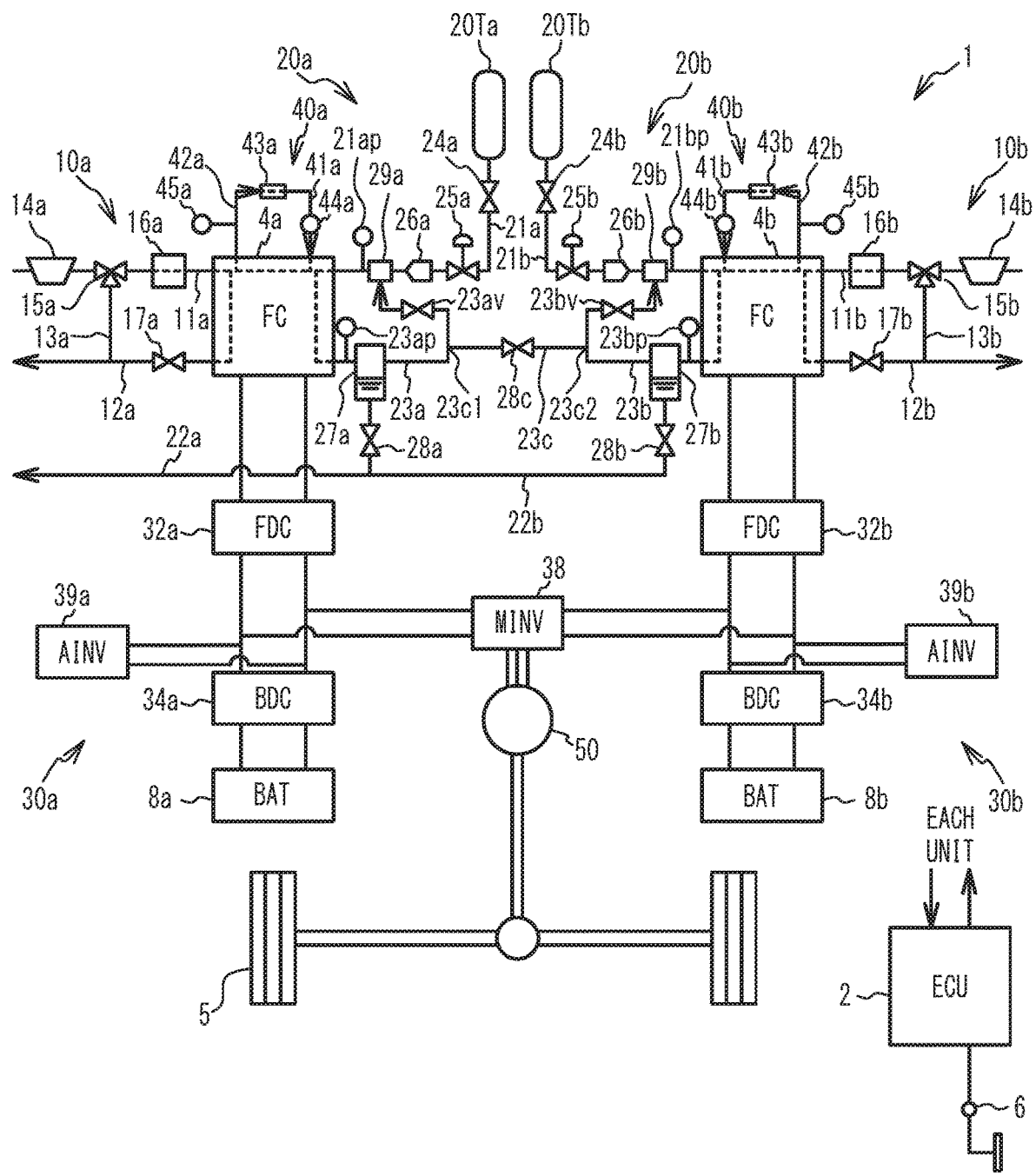
FIG. 1 is a configuration diagram of a fuel cell system mounted on a vehicle.

FIG. 1 is a configuration diagram of a fuel cell system (hereinafter, simply referred to as a system) 1 mounted on a vehicle. The system 1 includes an electronic control unit (ECU) 2, fuel cells (hereinafter, referred to as FCs) 4a and 4b, secondary batteries (hereinafter, referred to as BATs) 8a and 8b, cathode gas supply systems 10a and 10b, anode gas supply systems 20a and 20b, cooling systems 40a and 40b, electric power control systems 30a and 30b, and a motor 50.

The FCs 4a and 4b are fuel cells that are supplied with cathode gas and anode gas to generate electric power. In the present embodiment, air containing oxygen is used as the cathode gas, and hydrogen gas is used as the anode gas. Each of the FCs 4a and 4b include a plurality of solid polymer electrolyte unit cells that is stacked. In the present embodiment, the FCs 4a and 4b are identical to each other, and have the same rated output, but this does not intend to suggest any limitation. The FCs 4a and 4b are examples of first and second fuel cells.

The cathode gas supply systems 10a and 10b supply air containing oxygen, as the cathode gas, to the FCs 4a and 4b, respectively. Specifically, the cathode gas supply system 10a includes a supply pipe 11a, a discharge pipe 12a, a bypass pipe 13a, an air compressor 14a, a bypass valve 15a, an intercooler 16a, and a back pressure valve 17a, while the cathode gas supply system 10b includes a supply pipe 11b, a discharge pipe 12b, a bypass pipe 13b, an air compressor 14b, a bypass valve 15b, an intercooler 16b, and a back pressure valve 17b.

The supply pipes 11a and 11b are connected to the cathode inlet manifolds of the FCs 4a and 4b, respectively. The discharge pipes 12a and 12b are connected to the cathode outlet manifolds of the FCs 4a and 4b, respectively. The supply pipe 11a and the discharge pipe 12a are communicated with each other through the bypass pipe 13a, while the supply pipe 11b and the discharge pipe 12b are communicated with each other through the bypass pipe 13b. The bypass valve 15a is disposed in the part where the supply pipe 11a and the bypass pipe 13a are connected, while the bypass valve 15b is disposed in the part where the supply pipe 11b and the bypass pipe 13b are connected. The bypass valve 15a changes the communication state between the supply pipe 11a and the bypass pipe 13a, while the bypass valve 15b changes the communication state between the supply pipe 11b and the bypass pipe 13b. The air compressor 14a, the bypass valve 15a, and the intercooler 16a are disposed in the supply pipe 11a in this order from the upstream side. The back-pressure valve 17a is disposed in the discharge pipe 12a, and is located further upstream than the part where the discharge pipe 12a and the bypass pipe 13a are connected. Similarly, the air compressor 14b, the bypass valve 15b, and the intercooler 16b are disposed in the supply pipe 11b in this order from the upstream side. The back-pressure valve 17b is disposed in the discharge pipe 12b, and is located further upstream than the part where the discharge pipe 12b and the bypass pipe 13b are connected.

The air compressors 14a and 14b supply air containing oxygen, as the cathode gas, to the FCs 4a and 4b through the supply pipes 11a and 11b, respectively. The cathode gas supplied to the FCs 4a and 4b is discharged through the discharge pipes 12a and 12b, respectively. The intercoolers 16a and 16b cool the cathode gas supplied to the FCs 4a and 4b, respectively. The back-pressure valves 17a and 17b adjust the back pressures at the cathode sides of the FCs 4a and 4b, respectively. Air is an example of oxidant gas. The air compressors 14a and 14b are examples of first and second oxidant gas supply devices that supply oxidant gas to the FCs 4a and 4b, respectively.

The anode gas supply systems 20a and 20b supply hydrogen gas, as the anode gas, to the FCs 4a and 4b, respectively. Specifically, the anode gas supply system 20a includes a tank 20Ta, a supply pipe 21a, a discharge pipe 22a, a return pipe 23a, a shut valve 23av, a tank valve 24a, a regulating valve 25a, an injector (hereinafter, referred to as an INJ) 26a, a gas-liquid separator 27a, a discharge valve 28a, and an ejector 29a, while the anode gas supply system 20b includes a tank 20Tb, a supply pipe 21b, a discharge pipe 22b, a return pipe 23b, a shut valve 23bv, a tank valve 24b, a regulating valve 25b, an INJ 26b, a gas-liquid separator 27b, a discharge valve 28b, and an ejector 29b. The anode gas supply systems 20a and 20b share a communication pipe 23c and a selector valve 28c. The hydrogen gas is an example of fuel gas.

The tanks 20Ta and 20Tb store hydrogen gas in a high-pressure state therein. The tank 20Ta is connected to the anode inlet manifold of the FC 4a through the supply pipe 21a. Similarly, the tank 20Tb is connected to the anode inlet manifold of the FC 4b through the supply pipe 21b. The tanks 20Ta and 20Tb store hydrogen gas therein. The discharge pipes 22a and 22b are connected to the anode outlet manifolds of the FCs 4a and 4b, respectively. The gas-liquid separator 27a and the supply pipe 21a are communicated with each other through the return pipe 23a, while the gas-liquid separator 27b and the supply pipe 21b are communicated with each other through the return pipe 23b.

The tank valve 24a, the regulating valve 25a, the INJ 26a, and the ejector 29a are disposed in the supply pipe 21a in this order from the upstream side. While the tank valve 24a is opened, the open degree of the regulating valve 25a is adjusted, and the INJ 26a injects the anode gas. Thus, the anode gas passes through the ejector 29a and is then supplied to the FC 4a. The driving of the tank valve 24a, the regulating valve 25a, and the INJ 26a is controlled by the ECU 2. The same applies to the tank valve 24b, the regulating valve 25b, the INJ 26b, and the ejector 29b.

Here, the INJs 26a and 26b are examples of first and second fuel gas supply devices that supply the anode gas to the FCs 4a and 4b, respectively. The ejector 29a is an example of a first ejector that is connected to the return pipe 23a, and guides the anode gas discharged from the FC 4a to the FC 4a together with the anode gas supplied from the INJ 26a. The ejector 29b is an example of a second ejector that is connected to the return pipe 23b, and guides the anode gas discharged from the FC 4b to the FC 4b together with the anode gas supplied from the INJ 26b.

No pump for sending the anode gas discharged from the FCs 4a and 4b to the FCs 4a and 4b is disposed in the return pipes 23a and 23b. The anode gas is sent by the ejectors 29a and 29b, instead of the pump. Thus, the device cost of the system 1 is reduced compared with that in a case where a pump is provided.

Additionally, an inlet pressure sensor 21ap that detects the pressure at the inlet of the anode gas flow path in the FC 4a (hereinafter, referred to as an inlet pressure) is disposed in the supply pipe 21a between the FC 4a and the ejector 29a. On the other hand, a similar inlet pressure sensor 21bp is disposed in the supply pipe 21b.

The gas-liquid separator 27a and the discharge valve 28a are disposed in the discharge pipe 22a in this order from the upstream side. The gas-liquid separator 27a separates water from the anode gas discharged from the FC 4a and stores the water. The water stored in the gas-liquid separator 27a is discharged to the outside of the system 1 through the discharge pipe 22a by opening the discharge valve 28a. The driving of the discharge valve 28a is controlled by the ECU 2. The same applies to the gas-liquid separator 27b and the discharge valve 28b, but the discharge pipe 22b is connected to the middle of the discharge pipe 22a. That is, as the discharge valve 28b opens, water stored in the gas-liquid separator 27b is discharged to the outside of the system 1 through the discharge pipes 22b and 22a.

The return pipe 23a is a pipe for returning the anode gas discharged from the FC 4a to the FC 4a again. The upstream end of the return pipe 23a is connected to the gas-liquid separator 27a, and the downstream end of the return pipe 23a is connected to the ejector 29a. The ejector 29a uses the flow of the anode gas injected from the INJ 26a as driving flow to suck in the anode gas discharged from the FC 4a from the return pipe 23a and returns the anode gas discharged from the FC 4a to the FC 4a again. Thus, the part located further downstream than the ejector 29a of the supply pipe 21a, the part located further upstream than the gas-liquid separator 27a of the discharge pipe 22a, and the return pipe 23a are an example of a first circulation path that circulates the anode gas discharged from the FC 4a to the FC4a. Similarly, the part located further downstream than the ejector 29b of the supply pipe 21b, the part located further upstream than the gas-liquid separator 27b of the discharge pipe 22b, and the return pipe 23b are an example of a second circulation path that circulates the anode gas discharged from the FC 4b to the FC 4b.

A first end 23c1 of the communication pipe 23c is connected to the return pipe 23a, and a second end 23c2 of the communication pipe 23c is connected to the return pipe 23b. The selector valve 28c that opens and closes the communication pipe 23c is provided to the communication pipe 23c. When the selector valve 28c is closed, the return pipes 23a and 23b are shut-off from each other. When the selector valve 28c is opened, the return pipes 23a and 23b are communicated with each other through the communication pipe 23c, i.e., the aforementioned first and second circulation paths are communicated with each other.

Hereinafter, in the present description, when simply referred to as a "communication state", it means a state where the aforementioned first and second circulation paths are communicated with each other by opening the selector valve 28c. The communication pipe 23c is an example of a communication path communicated with the return pipes 23a and 23b. In addition, the selector valve 28c is an example of an opening/closing device that causes the return pipes 23a and 23b to be communicated with each other or to be disconnected from each other by opening/closing the communication pipe 23c.

The shut valve 23av is disposed in the return pipe 23a on the downstream side of the part where the return pipe 23a is connected to the first end 23c1 of the communication pipe 23c. The shut valve 23av opens and closes the return pipe 23a at the downstream side of the part where the return pipe 23a is connected to the communication pipe 23c according to the control of the ECU 2. When the shut valve 23av is closed, the circulation of the anode gas through the return pipe 23a is stopped. On the other hand, the similar shut valve 23bv is disposed in the return pipe 23b. The shut valves 23av and 23bv are examples of first and second circulation valves disposed in the return pipes 23a and 23b on the downstream side of the parts where the return pipes 23a and 23b are connected to the communication pipe 23c, respectively.

An outlet pressure sensor 23ap that detects the pressure at the outlet of the anode gas flow path in the FC 4a (hereinafter, referred to as an outlet pressure) is disposed in the return pipe 23a between the FC 4a and the gas-liquid separator 27a. On the other hand, a similar outlet pressure sensor 23bp is disposed in the return pipe 23b.

The cooling systems 40a and 40b cool the FCs 4a and 4b heated through the power generation, respectively. The cooling system 40a includes a cooling water supply pipe 41a, a cooling water discharge pipe 42a, a radiator 43a, a pump 44a, and a temperature sensor 45a, while the cooling system 40b includes a cooling water supply pipe 41b, a cooling water discharge pipe 42b, a radiator 43b, a pump 44b, and a temperature sensor 45b. In this example, cooling water is described as coolant for cooling the FCs 4a and 4b, but this does not intend to suggest any limitation, and other coolant may be used.

The radiators 43a and 43b cool the cooling water that has increased in temperature because of absorption of the heat of the FCs 4a and 4b, by, for example, air-cooling, respectively. The cooled cooling water passes through the cooling water supply pipes 41a and 41b to be supplied to the FCs 4a and 4b, respectively. The cooling water supply pipes 41a and 41b are connected to the inlets of the cooling water manifolds of the FCs 4a and 4b, respectively.

The cooling water is discharged to the cooling water discharge pipes 42a and 42b after cooling the FCs 4a and 4b. The cooling water discharge pipes 42a and 42b are connected to the outlets of the cooling water manifolds of the FCs 4a and 4b, respectively. The discharged cooling water circulates to the radiators 43a and 43b.

The pump 44a for circulating the cooling water between the radiator 43a and the FC 4a is disposed in the cooling water supply pipe 41a. Similarly, the pump 44b for circulating the cooling water between the radiator 43b and the FC 4b is disposed in the cooling water supply pipe 41b.

The temperature sensors 45a and 45b for measuring the temperature of the cooling water are provided to the cooling water discharge pipes 42a and 42b, respectively. The temperature sensors 45a and 45b are examples of first and second measuring devices that measure the temperatures of the FCs 4a and 4b, respectively.

The electric power control system 30a includes a fuel cell DC/DC converter (hereinafter, referred to as an FDC) 32a, a battery DC/DC converter (hereinafter, referred to as a BDC) 34a, and an auxiliary inverter (hereinafter, referred to as an AINV) 39a, while the electric power control system 30b includes an FDC 32b, a BDC 34b, and an AINV 39b. The electric power control systems 30a and 30b share a motor inverter (hereinafter, referred to as an MINV) 38 connected to the motor 50. The FDCs 32a and 32b respectively adjust the direct-current (DC) power from the FCs 4a and 4b to output the adjusted DC power to the MINV 38. The BDCs 34a and 34b respectively adjust the DC power from the BATs 8a and 8b to output the adjusted DC power to the MINV 38. The electric power generated by the FCs 4a and 4b can be stored in the BATs 8a and 8b, respectively. The MINV 38 converts the input DC power to three-phase alternate-current (AC) power, and supplies the three-phase AC power to the motor 50. The motor 50 drives wheels 5 to cause the vehicle to run.

The electric power of the FC 4a and the BAT 8a can be supplied to a load device other than the motor 50 through the AINV 39a. Similarly, the electric power of the FC 4b and the BAT 8b can be supplied to a load device through the AINV 39b. Here, the load device includes auxiliary machines for the FCs 4a and 4b and auxiliary machines for the vehicle. The auxiliary machines for the FCs 4a and 4b include the air compressors 14a and 14b, the bypass valves 15a and 15b, the back pressure valves 17a and 17b, the shut valves 23av and 23bv, the tank valves 24a and 24b, the regulating valves 25a and 25b, the INJs 26a and 26b, and the discharge valves 28a and 28b. The auxiliary machines for the vehicle include, for example, an air conditioner unit, a lighting system, hazard lights, and the like.

The ECU 2 includes a central processing unit (CPU), a read only memory (ROM), and a random access memory (RAM). Electrically connected to the ECU 2 are an accelerator opening sensor 6, the air compressors 14a and 14b, the bypass valves 15a and 15b, the back pressure valves 17a and 17b, the shut valves 23av and 23bv, the tank valves 24a and 24b, the regulating valves 25a and 25b, the INJs 26a and 26b, the discharge valves 28a and 28b, the selector valve 28c, the FDCs 32a and 32b, the BDCs 34a and 34b, the temperature sensors 45a and 45b, the inlet pressure sensors 21ap and 21bp, and the outlet pressure sensors 23ap and 23bp. The ECU 2 calculates the output current values required of the FCs 4a and 4b (hereinafter, referred to as require current values) based on the detection value of the accelerator opening sensor 6. In addition, the ECU 2 controls the auxiliary machines for the FCs 4a and 4b in accordance with the required current value to control the total electric power generated by the FCs 4a and 4b.

Furthermore, the ECU 2 determines whether there is a possibility of occurrence of flooding in the FCs 4a and 4b due to the power generation of the FCs 4a and 4b. When determining that there is a possibility of occurrence of flooding in the FCs 4a and 4b, the ECU 2 suspends the power generation of one of the FCs 4a and 4b while maintaining the supply of the anode gas, and causes the selector valve 28c to make the return pipes 23a and 23b be communicated with each other. This control causes the anode gas to flow from the return pipe 23a, 23b of the one of the FCs 4a and 4b into the return pipe 23b, 23a of the other of the FCs 4a and 4b through the communication pipe 23c. Thus, increase in the flow rate of the anode gas removes the liquid water collecting in the return pipe 23b, 23a of the other of the FCs 4a and 4b, thereby inhibiting occurrence of flooding in the other of FCs 4a and 4b. In addition, since the power generation of the one of the FCs 4a and 4b is suspended, liquid water is not produced, and thereby, occurrence of flooding is inhibited.

In addition, when the return pipes 23b and 23a are communicated with each other, the other of the FCs 4a and 4b can increase generated electric power using the anode gas flowing from the return pipe 23a, 23b of the one of the FCs 4a and 4b to the return pipe 23b, 23a of the other of the FCs 4a and 4b through the communication pipe 23c such that a decline in generated electric power due to the suspension of the power generation of the one of the FCs 4a and 4b is compensated. Thus, the anode gas is inhibited from being wasted without being used for power generation. The ECU 2 is an example of a controller that controls the FCs 4a and 4b, the INJs 26a and 26b, and the selector valve 28c. In addition, the ECU 2 may be separately provided for each of the FCs 4a and 4b, and a configuration in which three or more ECUs 2 are connected so as to communicate with each other may be employed.

Example of Power Generation Control

Figure 2A:
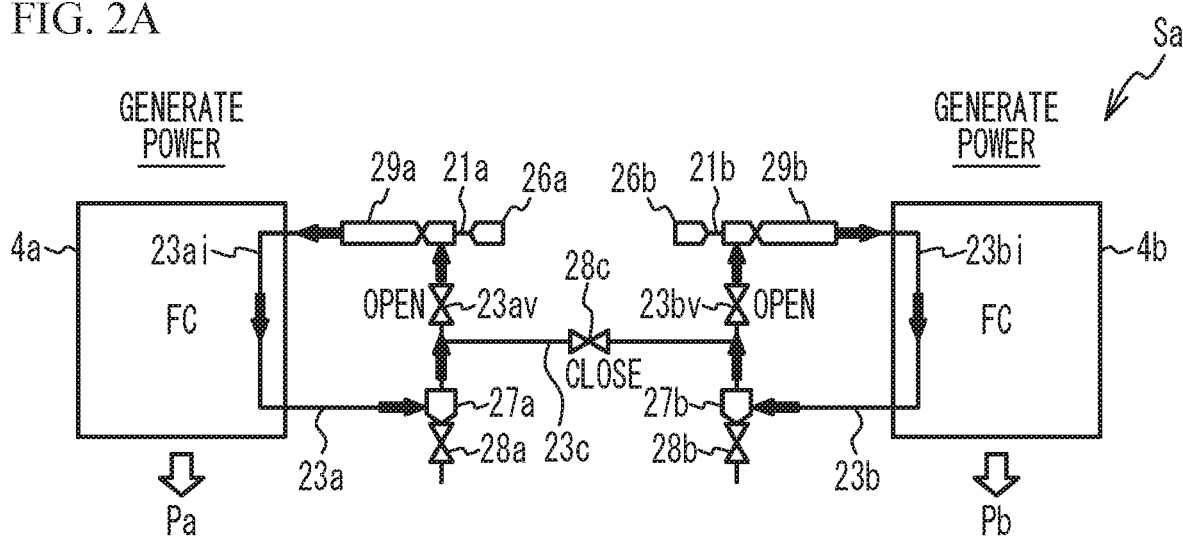
FIG. 2A to FIG. 2C illustrate a flow of anode gas.
Figure 2B:
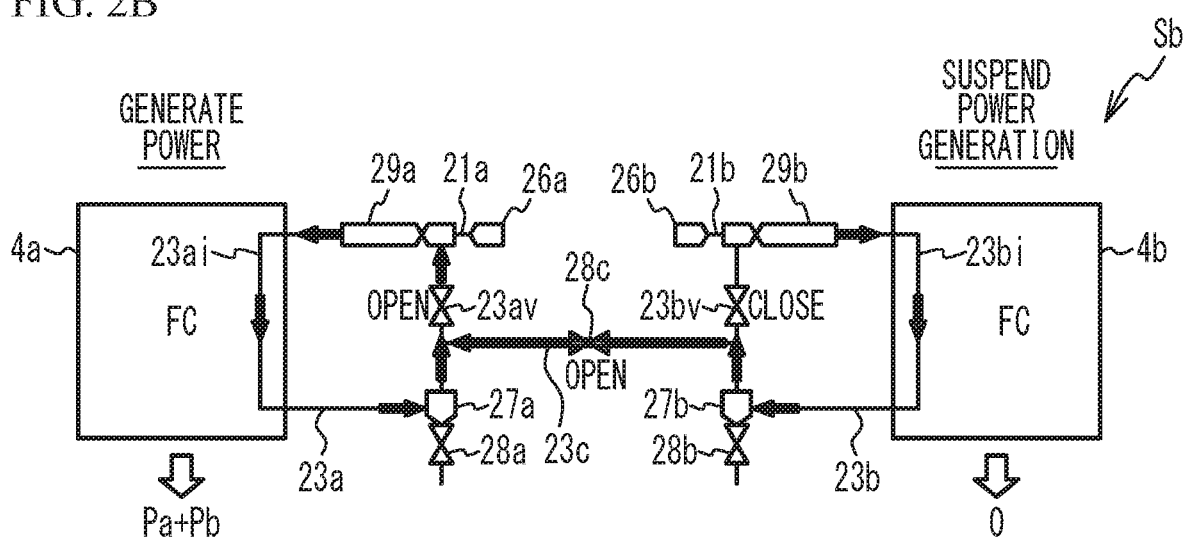
Figure 2C:
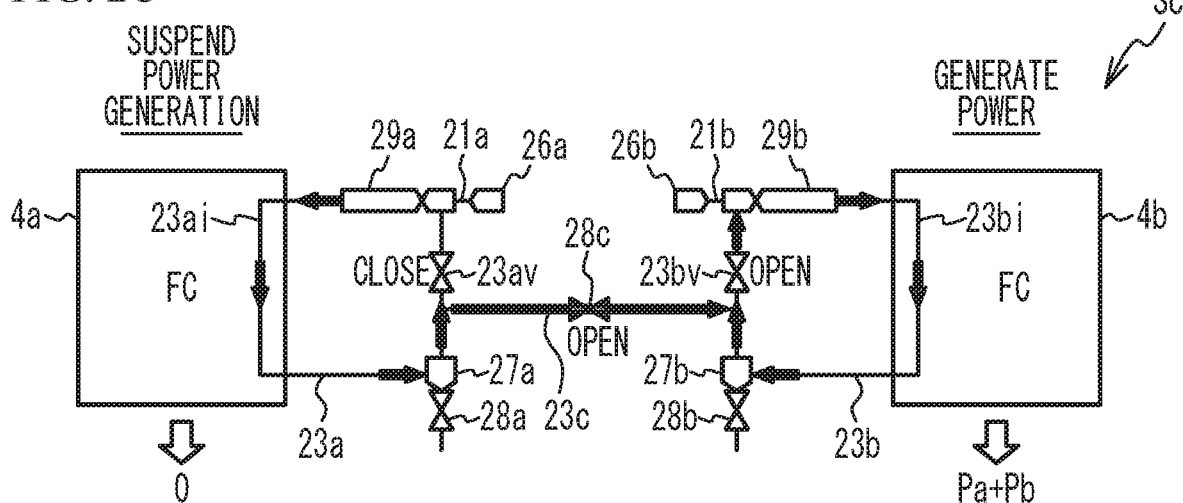

FIG. 2A to FIG. 2C illustrate a flow of the anode gas. In FIG. 2A to FIG. 2C, the same reference numerals are provided to components in common with those illustrated in FIG. 1, and the description thereof is omitted. Arrows illustrated on the return pipes 23a and 23b, the supply pipes 21a and 21b, the anode gas flow paths 23ai and 23bi, and the communication pipe 23c indicate the direction in which the anode gas flows.

The reference character Sa indicates the flow of the anode gas while both the FCs 4a and 4b generates electric power. In this case, since the selector valve 28c is closed, no anode gas flows between the return pipes 23a and 23b. Since the shut valves 23av and 23bv are opened, the anode gas can flow through the return pipes 23a and 23b to circulate to the FCs 4a and 4b, respectively.

The anode gas injected from the INJ 26a passes through the ejector 29a and the supply pipe 21a, enters the anode gas flow path 23ai in the FC 4a, and is then used for power generation. The remaining anode gas passes through the return pipe 23a to return to the ejector 29a. The anode gas injected from the INJ 26b passes through the ejector 29b and the supply pipe 21b, enters the anode gas flow path 23bi in the FC 4b, and is then used for power generation. The remaining anode gas passes through the return pipe 23b to return to the ejector 29b.

Thus, the FC 4a generates electric power using the anode gas circulating through the return pipe 23a, and the FC 4b generates electric power using the anode gas circulating through the return pipe 23b. Here, the electric power generated by the FC 4a is represented by Pa, and the electric power generated by the FC 4b is represented by Pb.

The reference character Sb indicates the flow of the anode gas while the FC 4a generates electric power and the power generation of the FC 4b is suspended. When determining that there is a possibility of flooding due to the power generation of both the FCs 4a and 4b, the ECU 2 suspends the power generation of the FC 4b while maintaining the supply of the anode gas from the injector 26b, and opens the selector valve 28c. This control causes the return pipes 23a and 23b to be communicated with each other through the communication pipe 23c. In this case, the pressure in the anode gas flow path 23ai of the FC 4a becomes less than the pressure of the FC 4b of which the power generation is suspended because the anode gas is consumed by the power generation of the FC 4a. Thus, the anode gas flows through the communication pipe 23c from the return pipe 23b of the FC 4b to the return pipe 23a of the FC 4a.

The anode gas injected from the INJ 26b enters the anode gas flow path of the FC 4b, but is discharged to the return pipe 23b without being consumed because the power generation of the FC 4b is suspended. The discharged anode gas flows from the return pipe 23b into the return pipe 23a, passes through the supply pipe 21a and the ejector 29a, and then enters the anode gas flow path 23ai in the FC 4a to be used for power generation. In addition, the anode gas injected from the INJ 26a enters the anode gas flow path 23ai to be used for power generation. Thus, the flow rate of the anode gas flowing through the return pipe 23a becomes greater than that in the state before the power generation of the FC 4b is suspended (the state indicated by the reference character Sa), and thereby, the liquid water in the return pipe 23a can be easily discharged. Therefore, reduced is the possibility that catalyst-carrying carbon is oxidized by the liquid water and eluted due to the lack of the anode gas at the anode electrode of the FC 4a and the power generation performance thereby deteriorates.

Here, the FC 4a, which is generating electric power, consumes the anode gas, and the FC 4b, of which the power generation is suspended, does not consume the anode gas. Thus, the pressure in the anode gas flow path 23ai in the FC 4a, which is generating electric power, is lower than the pressure in the anode gas flow path 23bi in the FC 4b, of which the power generation is suspended. Thus, the anode gas passes through the communication pipe 23c from the return pipe 23b of the FC 4b, of which the power generation is suspended, and flows into the return pipe 23a of the FC 4a, which is generating electric power.

In addition, when opening the selector valve 28c to cause the return pipes 23a and 23b to be communicated with each other, the ECU 2 closes the shut valve 23bv disposed in the return pipe 23b of the FC 4b of which the power generation is suspended. Thus, the circulation of the anode gas through the return pipe 23b is stopped, and thereby, the flow rate of the anode gas flowing through the communication pipe 23c can be made to be greater than the flow rate when the selector valve 28c is closed. Thus, the flow rate of the anode gas flowing into the return pipe 23a increases, and the liquid water is more effectively discharged.

As described above, the FC 4a, which is generating electric power, is supplied with the anode gas supplied to the FC 4b, of which the power generation is suspended, from the communication pipe 23c and increases generated electric power by the decline in generated electric power due to the suspension of the power generation of the FC 4b such that the decline in generated electric power is compensated for by power generation using the supplied anode gas. That is, the electric power generated by the FC 4a becomes the value (Pa+Pb) that is the sum of the electric power Pa generated by the FC 4a before the power generation of the FC 4b is suspended and the electric power Pb supposed to be generated by the FC 4b, of which the power generation is suspended, if the power generation of the FC 4b is not suspended. The electric power generated by the FC 4b is 0.

Thus, useless supply of the anode gas that is not used for power generation is effectively inhibited. Here, the ECU 2 maintains the injection amounts (i.e., the supply amounts) of the anode gas from the INJs 26a and 26b at those before the power generation of the FC 4b is suspended, but may adjust the injection amount of the anode gas such that the FC 4a generates electric power according to the required current value. Furthermore, the ECU 2 may adjust the supply amount of the cathode gas by controlling the output of the air compressor 14a to generate electric power according to the required current value.

The anode gas is also supplied to the FC 4b of which the power generation is suspended. Thus, reduced is the possibility that catalyst-carrying carbon is oxidized by liquid water and eluted due to the lack of the anode gas at the anode electrode of the FC 4b and the power generation performance thereby deteriorates.

The reference character Sc indicates the flow of the anode gas while the FC 4b generates electric power and the power generation of the FC 4a is suspended. When determining that there is a possibility of occurrence of flooding due to the power generation of both the FCs 4a and 4b, the ECU 2 suspends the power generation of the FC 4a while maintaining the supply of the anode gas from the injector 26a, and opens the selector valve 28c. In addition, the ECU 2 closes the shut valve 23av.

This control causes the operation where the FCs 4a and 4b in the operation described above with reference to the reference character Sb are interchanged to be conducted. Thus, the electric power generated by the FC 4b becomes the value (Pa+Pb) that is the sum of the electric power Pa supposed to be generated by the FC 4a, of which the power generation is suspended, if the power generation of the FC 4a is not suspended and the electric power Pb generated by the FC 4b before the power generation of the FC 4a is suspended. The electric power generated by the FC 4a is 0.

The ECU 2 may suspend power generation of either one of the FCs 4a and 4b. However, by suspending power generation of, for example, the FC 4a or 4b of which the accumulated power generation time is longer, the age deterioration of the FC 4a or 4b can be inhibited. In this case, the ECU 2 may record information indicating power generation time of the FCs 4a and 4b in a storage medium such as a memory, refers to the information as the accumulated power generation time, and select the FC 4a or 4b of which the power generation is to be suspended.

[Operation of the Fuel Cell System]

Figure 3:
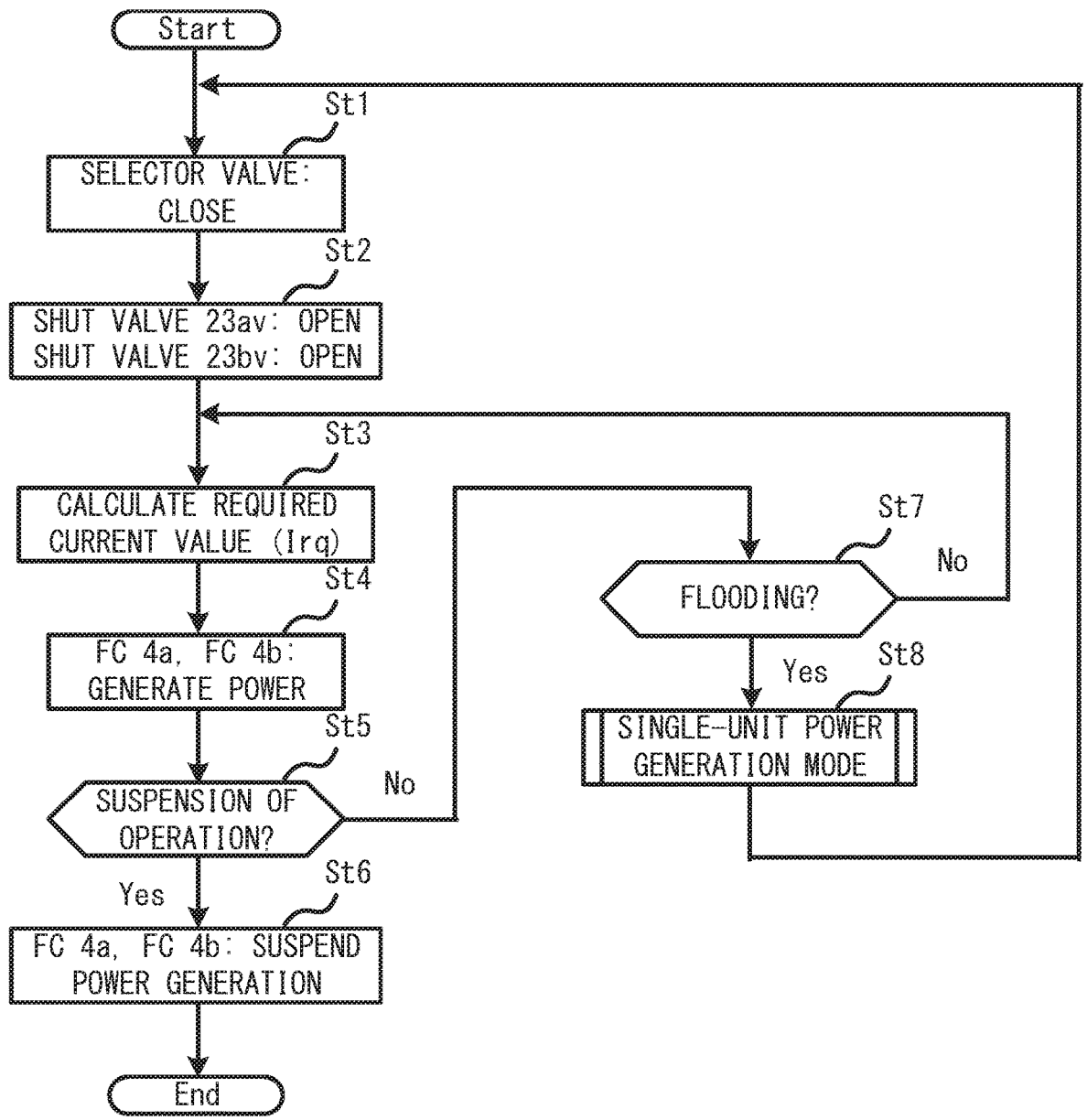
FIG. 3 is a flowchart of an exemplary operation of the fuel cell system.

FIG. 3 is a flowchart of an exemplary operation of the fuel cell system 1. This operation is executed when the ignition switch (not illustrated) for starting the vehicle is turned from Off to On. Each process in the flowchart is executed by functions of software executed by the CPU of the ECU 2, but this does not intend to suggest any limitation. Each process may be implemented by functions of a hardware device such as an integrated circuit (IC).

The ECU 2 closes the selector valve 28c such that the return pipes 23a and 23b are not communicated with each other (step St1). Then, the ECU 2 opens the shut valves 23av and 23bv such that the anode gas passes through the return pipes 23a and 23b to circulate to the FCs 4a and 4b, respectively (step St2).

Then, the ECU 2 calculates the required current value Irq of each of the FCs 4a and 4b based on, for example, the detection value of the accelerator opening sensor 6 (step St3). In this example, the ECU 2 sets the required current values Irq of the FCs 4a and 4b at the same value, but may set the required current values Irq of the FCs 4a and 4b at different values.

Then, the ECU 2 causes the FCs 4a and 4b to generate electric power according to the required current values Irq (step St4). In this case, the ECU 2 controls the injection amounts of the INJs 26a and 26b and the outputs of the air compressors 14a and 14b such that the supply amounts of the anode gas and the cathode gas become the amounts according to the required current values Irq. This control causes the system 1 to be in the state where the two FCs 4a and 4b generate electric power as indicated by the reference character Sa in FIG. 2A.

Then, the ECU 2 determines whether suspension of operation of the FCs 4a and 4b is instructed (step St5). For example, the ECU 2 determines that the suspension of the operation is instructed when the ignition switch is turned off.

When the suspension of the operation is instructed (step St5/Yes), the ECU 2 suspends power generation of the FCs 4a and 4b (step St6). In this case, the ECU 2 stops the injection of the INJs 26a and 26b and the outputs of the air compressors 14a and 14b such that the supply of the anode gas and the cathode gas is stopped.

When the suspension of the operation is not instructed (step St5/No), the ECU 2 determines whether there is a possibility of occurrence of flooding (hereinafter, referred to as a possibility of flooding) due to the power generation of the FCs 4a and 4b (step St7). One of methods for determining whether there is a possibility of flooding is comparing the required current value Irq with a threshold value as described later. When there is no possibility of flooding (step St7/No), the operation in and after step St3 is re-executed. When there is a possibility of flooding (step St7/Yes), the ECU 2 executes a single-unit power generation mode that causes only the FC 4a or 4b to generate electric power as indicated by the reference characters Sb and Sc in FIG. 2B and FIG. 2C (step St8). The details of the single-unit operation mode will be described later.

Then, to return the state of the system 1 to the state where two FCs 4a and 4 generate electric power as indicated by the reference character Sa in FIG. 2A, the ECU 2 re-executes the operation in and after step St1. The ECU 2 operates as described above.

Figure 4:
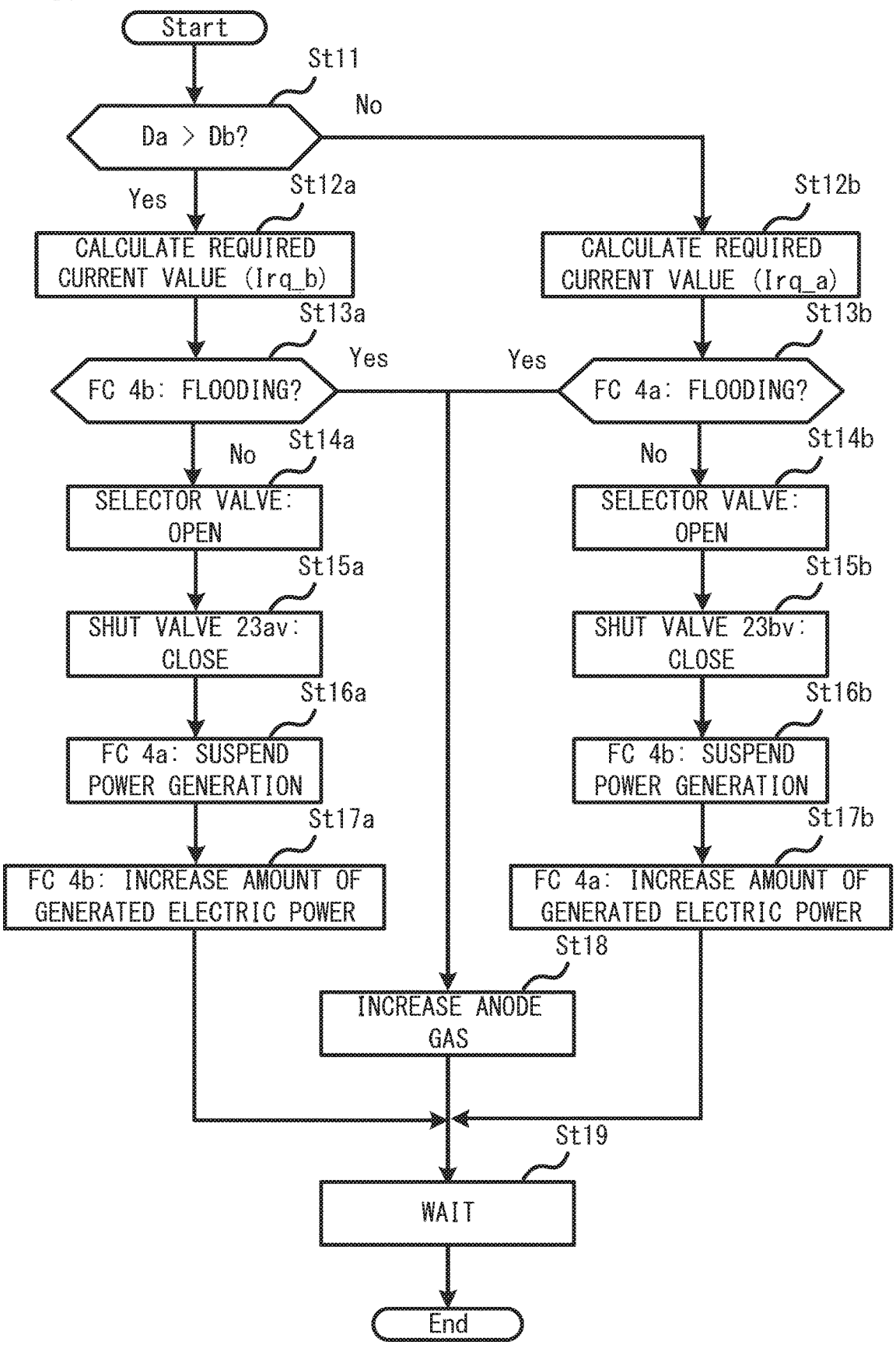
FIG. 4 is a flowchart of an exemplary operation of a single-unit power generation mode.

FIG. 4 is a flowchart of an exemplary operation of the single-unit power generation mode. This operation is executed in step St8 described above.

The ECU 2 compares the accumulated power generation time Da of the FC 4a with the accumulated power generation time Db of the FC 4b (step St11). The ECU 2 records information on the accumulated power generation time in a memory as described above, and selects the FC 4a or 4b of which the accumulated power generation time is longer as the FC of which the power generation is to be suspended based on the information. This allows the ECU 2 to inhibit the age deterioration of the FC of which the accumulated power generation time is longer of the FCs 4a and 4b.

When the accumulated power generation time Da of the FC 4a is longer than the accumulated power generation time Db of the FC 4b (step St11/Yes), the ECU 2 selects the FC 4a as the fuel cell of which the power generation is to be suspended, and executes the operation in steps St12a to St17a.

The ECU 2 calculates the required current value Irq_b required of the FC 4b when only the FC 4b generates electric power based on, for example, the detection value of the accelerator opening sensor 6 (step St12a). The required current value Irq_b is the required current value Irq calculated when the required current value Irq of the FC 4a is set at 0.

Then, the ECU 2 determines whether there is a possibility of flooding in the FC 4b due to power generation by only the FC 4b to check whether the suspension of the power generation of the FC 4a is effective (step St13a). One of methods for determining whether there is a possibility of flooding is, for example, comparing the required current value Irq_b with the threshold value as described later.

When there is a possibility of flooding (step St13a/Yes), the possibility of flooding is not eliminated by the suspension of the power generation of the FC 4a. Thus, the ECU 2 increases the supply amounts of the anode gas of the FCs 4a and 4b by increasing the outputs of the INJs 26a and 26b (step St18). This increases the flow rate of the anode gas circulating through the return pipes 23a and 23b, eliminating a possibility of flooding. Then, the ECU 2 waits for a period of time sufficient to eliminate a possibility of flooding (step St19), and ends the operation of the single-unit power generation mode.

When there is no possibility of flooding (step St13a/No), the ECU 2 opens the selector valve 28c such that the return pipes 23a and 23b are communicated with each other (step St14a). Then, the ECU 2 closes the shut valve 23av of the FC 4a of which the power generation is to be suspended such that the flow rate of the anode gas flowing through the communication pipe 23c increases (step St15a).

Then, the ECU 2 suspends the power generation of the FC 4a (step St16a). In this case, the ECU 2 suspends the power generation of the FC 4a by, for example, reducing or stopping the output of the air compressor 14a. That is, the ECU 2 causes the air compressor 14a to reduce the supply of the cathode gas. Thus, the power consumption of the air compressor 14a is reduced. Instead of controlling the air compressor 14a, the ECU 2 may control the switch element of the FDC 32a such that the connection between the FC 4a and the electronic load is disconnected to suspend the power generation of the FC 4a. In addition, the ECU 2 maintains the supply of the anode gas to the FC 4a such that the remaining FC 4b can be supplied with the anode gas sufficient to generate electric power according to the required current value Irq_b.

Since the anode gas flows from the return pipe 23a of the FC 4a, of which the power generation is suspended, to the return pipe 23b of the FC 4b, which is generating electric power, the flow rate of the anode gas in the return pipe 23b increases. Thus, even when the pump for sending the anode gas discharged from the FC 4b to the FC 4b is not connected to the return pipe 23b, the liquid water remaining in the return pipe 23b can be discharged and thereby, occurrence of flooding is inhibited.

As described above, the ECU 2 determines, in advance, whether there is a possibility of flooding when causing the FC 4b to generate electric power while suspending the power generation of the FC 4a in step St13a. When there is no possibility of flooding, the ECU 2 suspends the power generation of the FC 4a. Thus, the ECU 2 can check whether the suspension of the power generation of the FC 4a is effective before suspending the power generation of the FC 4a.

Then, the ECU 2 increases the electric power generated by the FC 4b according to the required current value Irq_b (step St17a). In this case, the ECU 2 increases the injection amount of the INJ 26b when the supply of the anode gas is insufficient to generate electric power according to the required current value Irq_b. In addition, the ECU 2 increases the output of the air compressor 14b, i.e., the supply amount of the cathode gas when the supply amount of the cathode gas is insufficient to generate electric power according to the required current value Irq_b. Thus, even when the amount of the cathode gas is insufficient, the generated electric power can be maintained. It is not necessary for the ECU 2 to control the INJ 26a and the air compressor 14a when both the supply amounts of the anode gas and the cathode gas are sufficient to generate electric power according to the required current value Irq_b.

Then, the ECU 2 waits for a period of time sufficient to eliminate a possibility of flooding (step St19), and ends the operation of the single-unit power generation mode.

When the accumulated power generation time Da of the FC 4a is equal to or less than the accumulated power generation time Db of the FC 4b (step St11/No), the ECU 2 selects the FC 4b as the fuel cell of which the power generation is to be suspended, and executes the operation in steps St12b to St17b. The operation in this case is the operation in which the FCs 4a and 4b of the above described operation executed when the FC 4a is selected as the fuel cell of which the power generation is to be suspended are interchanged, and the description thereof is simplified.

The ECU 2 calculates the required current value Irq_a required of the FC 4a when only the FC 4a generates electric power, based on, for example, the detection value of the accelerator opening sensor 6 (step St12b). The ECU 2 determines whether there is a possibility of flooding due to the power generation by only the FC 4a to check whether the suspension of the power generation of the FC 4b is effective (step St13b). One of methods for determining whether there is a possibility of flooding is, for example, comparing the required current value Irq_a with the threshold value as described later. When there is a possibility of flooding (step St13b/Yes), the supply amounts of the anode gas of the FCs 4a and 4b are increased (step St18). Then, the ECU 2 waits for a period of time sufficient to eliminate a possibility of flooding (step St19), and ends the operation of the single-unit power generation mode.

When there is no possibility of flooding (step St13b/No), the selector valve 28c is opened (step St14b). Then, the ECU 2 closes the shut valve 23bv of the FC 4b of which the power generation is to be suspended (step St15b).

Then, the ECU 2 suspends the power generation of the FC 4b (step St16b). Then, the ECU 2 increases the electric power generated by the FC 4a according to the required current value Irq_a (step St17b). Then, the ECU 2 waits for a period of time sufficient to eliminate a possibility of flooding (step St19), and ends the operation of the single-unit power generation mode.

As described above, when there is a possibility of flooding, the ECU 2 suspends the power generation of one of the FCs 4a and 4b, and supplies the other of the FCs 4a and 4b with the anode gas to be supplied to the FC 4a or 4b of which the power generation is suspended through the communication pipe 23c. The other of the FCs 4a and 4b increases the generated electric power using the anode gas supplied through the communication pipe 23c such that the decline in generated electric power due to the suspension of the power generation of the one of the FCs 4a and 4b is compensated for. The operation of the single-unit operation mode is executed as described above.

In the above configuration, since the anode gas flows from the return pipe 23a, 23b of one of the FCs 4a and 4b into the return pipe 23b, 23a of the other of the FCs 4a and 4b through the communication pipe 23c, the increase in the flow rate of the anode gas removes the liquid water that collects in the return pipe 23b, 23a of the other of the FCs 4a and 4b, thereby inhibiting occurrence of flooding in the other of the FCs 4a and 4b. In addition, since the power generation of the one of the FCs 4a and 4b is suspended, no liquid water is produced, and occurrence of flooding is thereby inhibited. Furthermore, the other of the FCs 4a and 4b increases the generated electric power using the anode gas flowing from the one of the FCs 4a and 4b into the other of the FCs 4a and 4b through the communication pipe 23c. Thus, the anode gas is inhibited from being wasted without being used for power generation.

Therefore, the system 1 of the present embodiment reduces the consumption of the fuel gas and inhibits flooding.

[Method for Determining a Possibility of Flooding]

Next, a method for determining a possibility of flooding employed by the ECU 2 will be described. Hereinafter, an exemplary method for determining a possibility of flooding will be described, but the method is not limited to this, and other methods for determining a possibility of flooding may be employed.

First Example of Determination

Figure 5A:
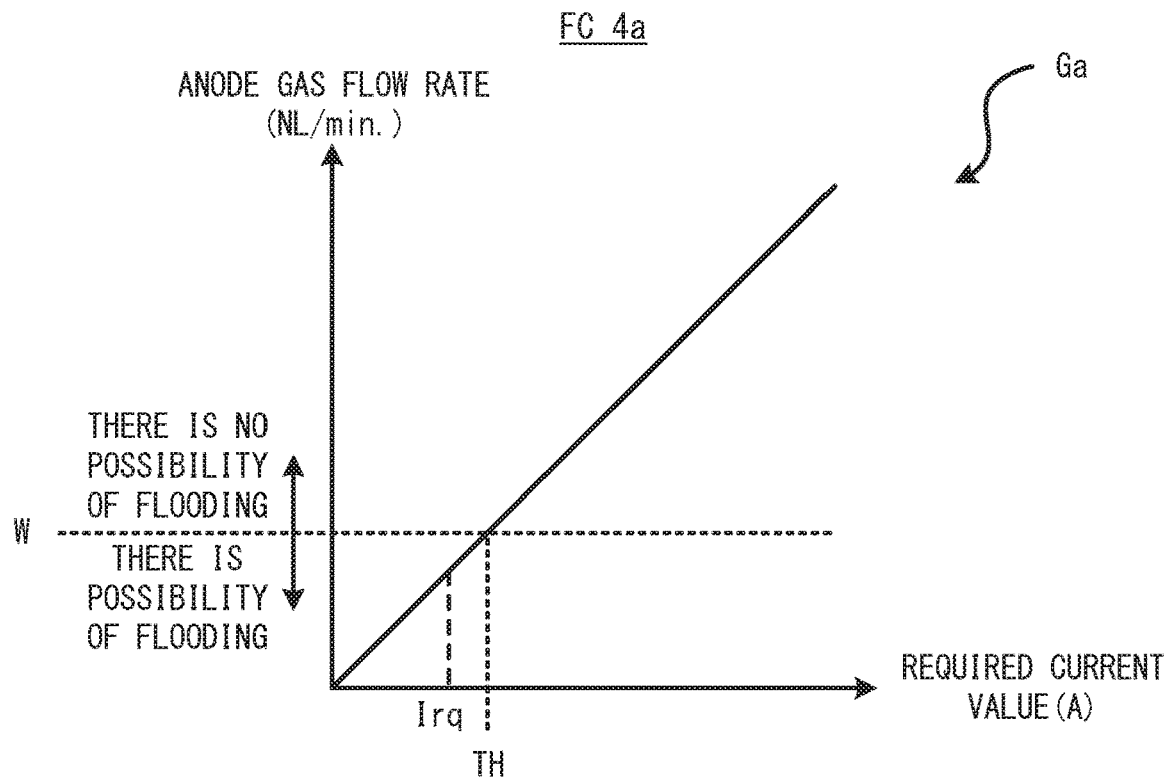
FIG. 5A and FIG. 5B illustrate a relationship between a required current value and a flow rate of the anode gas.
Figure 5B:
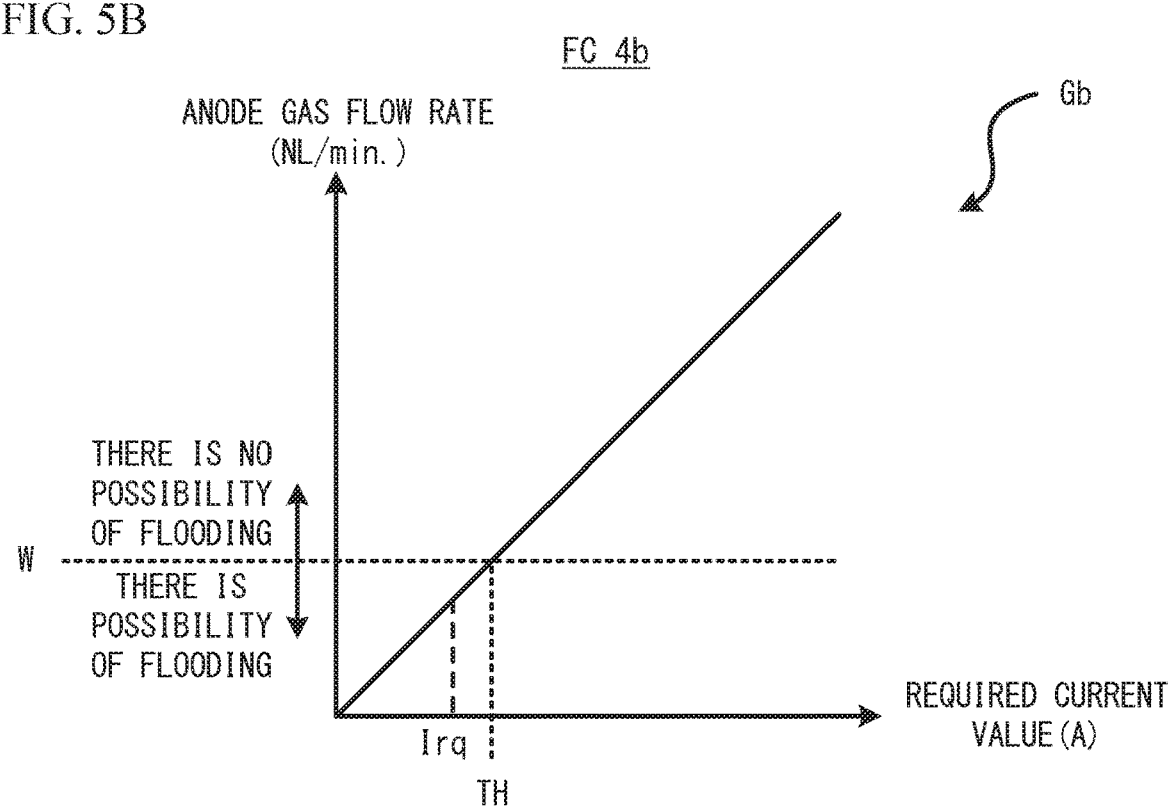

FIG. 5A and FIG. 5B illustrate a relationship between the required current value (A) and the anode gas flow rate (NL/min.). The anode gas flow rate is the sum of the supply amounts of the anode gas from the INJs 26a and 26b according to the required current value and the amounts of the anode gas circulating through the return pipes 23a and 23b, i.e., the circulation amounts of anode off-gas. The anode gas flow rate is practically proportional to the required current value.

The reference characters Ga and Gb indicate relationships between the required current values of the FCs 4a and 4b and the anode gas flow rate, respectively. The relationship between the required current value of the FC 4a and the anode gas flow rate is identical to the relationship between the required current value of the FC 4b and the anode gas flow rate.

The ECU 2 stores the threshold value TH for determining whether there is a possibility of flooding in a memory in advance. The threshold value TH is determined through simulations or experiments based on the various types of performance of the FCs 4a and 4b.

When the required current value is equal to or greater than the threshold value TH, the ECU 2 determines that there is no possibility of flooding. When the required current value is less than the threshold value TH, the ECU 2 determines that there is a possibility of flooding. This is because it becomes difficult to discharge the liquid water in the return pipes 23a and 23b because as the required current value decreases, the anode gas flow rate decreases. That is, when the anode gas flows at a flow rate equal to or greater than the anode gas flow rate W according to the threshold value TH, the liquid water is sufficiently discharged, but the flow of the anode gas at a flow rate less than the anode gas flow rate W is unable to sufficiently discharge the liquid water.

For example, in step St7 described above, when the required current value Irq while both the FCs 4a and 4b generate electric power is less than the threshold value TH, the ECU 2 determines that there is a possibility of flooding.

Figure 6A:
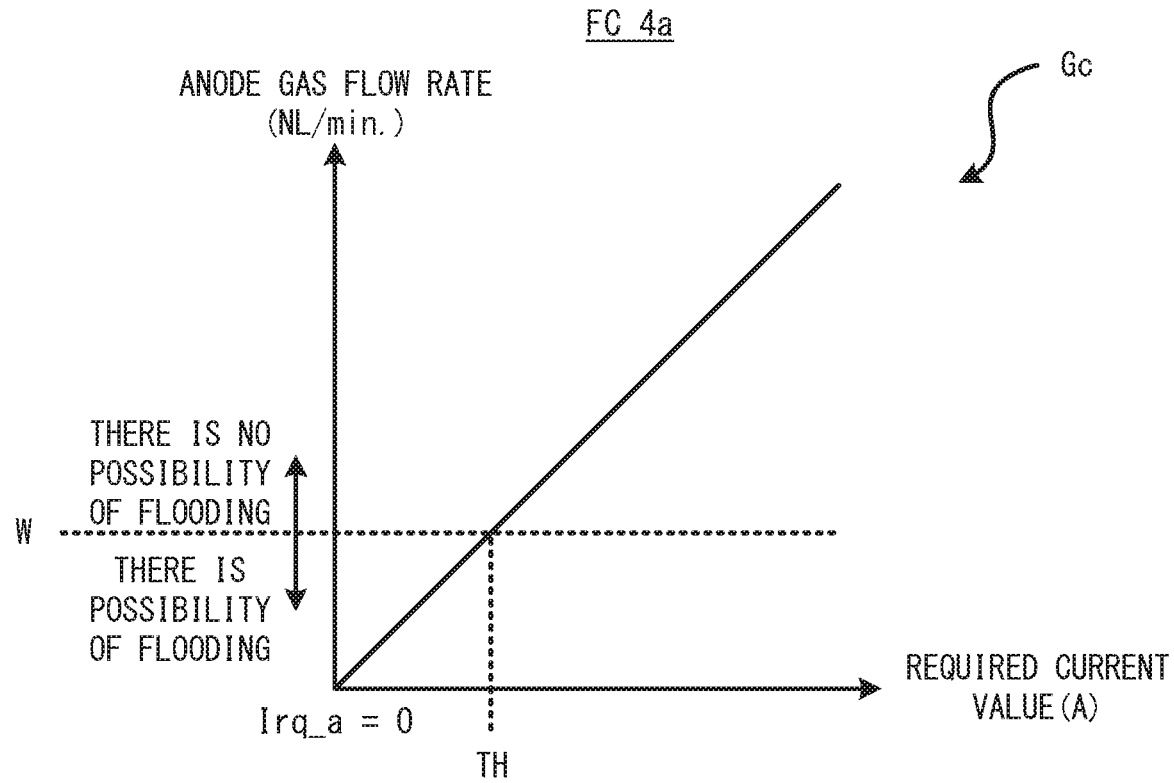
FIG. 6A and FIG. 6B illustrate examples of determination of a possibility of flooding in the single-unit power generation state.
Figure 6B:
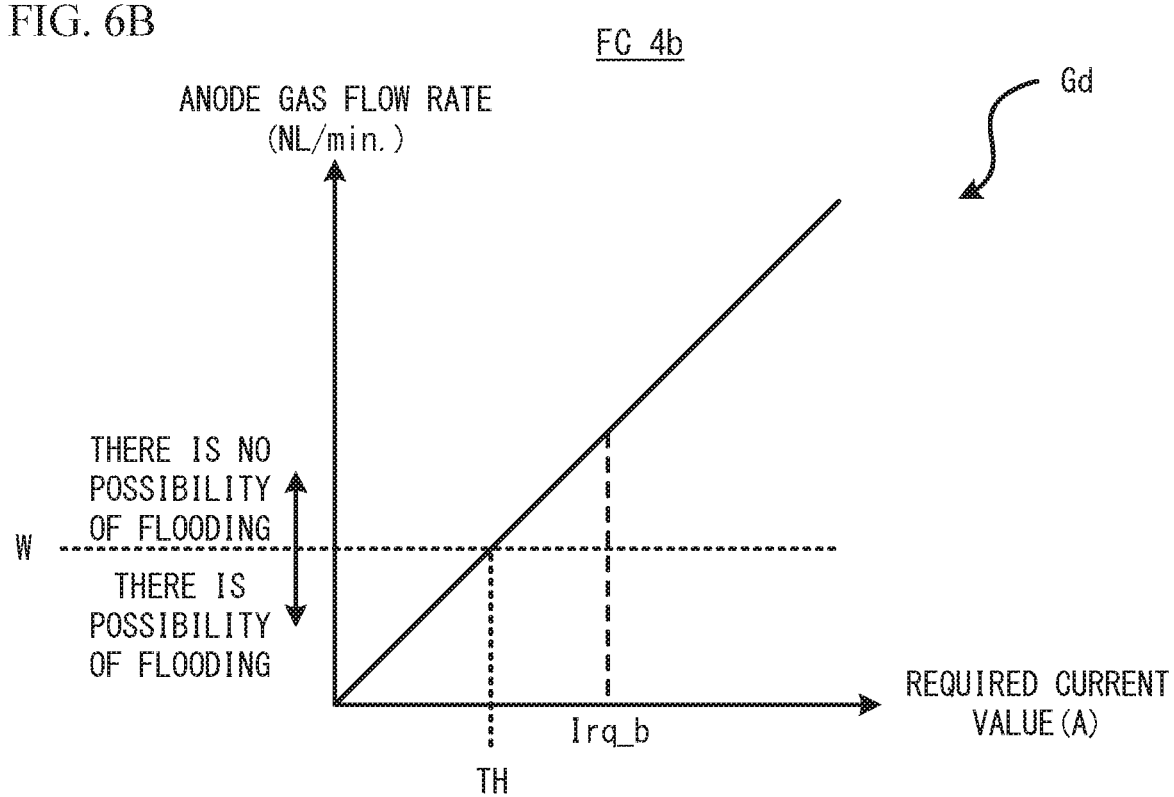

FIG. 6A and FIG. 6B illustrate examples of determination of a possibility of flooding in the single-unit power generation mode. In FIG. 6A and FIG. 6B, description of the contents in common with FIG. 5A and FIG. 5B is omitted.

For example, a case where the power generation of the FC 4a is suspended and the power generation of the FC 4b is maintained will be described. In this case, the ECU 2 sets the required current value Irq_a of the FC 4a at 0. Thus, the required current value Irq_a becomes less than the threshold value TH. However, since the power generation of the FC 4a is suspended, production of liquid water is also stopped, and thereby, flooding is inhibited.

In addition, the ECU 2 increases the required current value Irq_b of the FC 4b to compensate for the decline in generated electric power due to the suspension of the power generation of the FC 4a. When this control causes the required current value Irq_b to be equal to or greater than the threshold value TH, it is determined that there is no possibility of flooding. For example, in step St13a described above, when the required current value Irq_b becomes greater than the threshold value TH (the required current value Irq_b>the threshold value TH), the ECU 2 determines that there is no possibility of flooding in the FC 4b.

Figure 7:
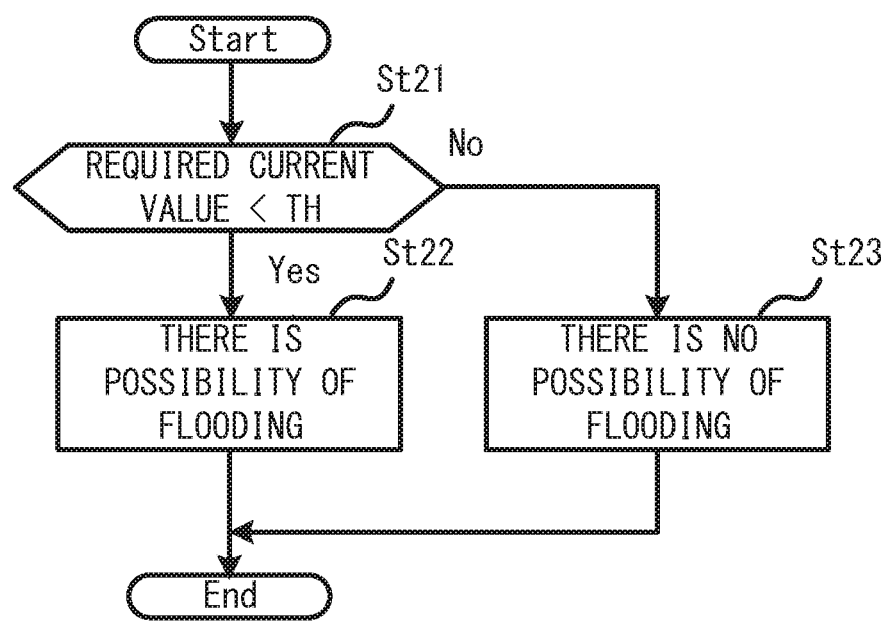
FIG. 7 is a flowchart of an exemplary process of a first example of determination.

FIG. 7 is a flowchart of an exemplary process of a first example of determination. This process is executed in steps St7, St13a, and St13b described above.

The ECU 2 compares the required current value Irq, Irq_a, Irq_b with the threshold value TH (step St21). When the required current value Irq, Irq_a, Irq_b is less than the threshold value TH (step St21/Yes), the ECU 2 determines that there is a possibility of flooding (step St22). In addition, when the required current value Irq, Irq_a, Irq_b is equal to or greater than the threshold value TH (step St21/No), the ECU 2 determines that there is no possibility of flooding (step St23). The process of the first example of determination is executed as described above.

As described above, when the required current value Irq, Irq_a, Irq_b is less than the threshold value TH, the ECU 2 determines that there is a possibility of flooding, and therefore, occurrence of flooding can be predicted with high accuracy based on the required current value Irq, Irq_a, Irq_b.

Second Example of Determination

Figure 8:
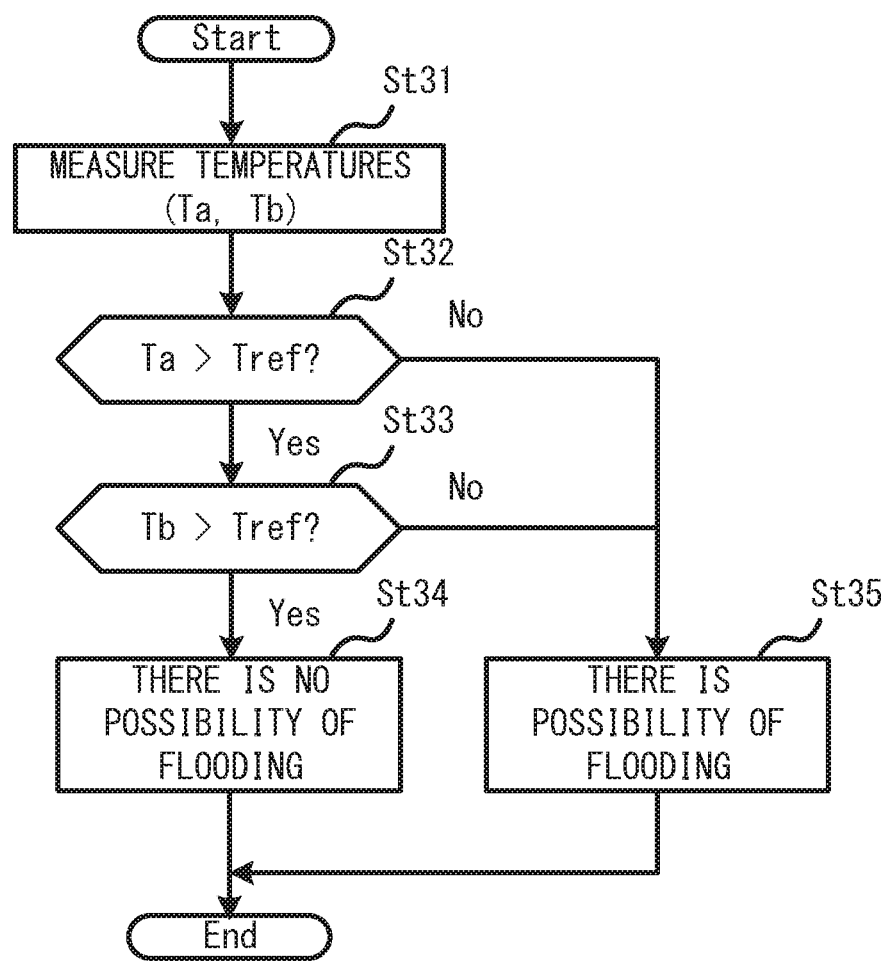
FIG. 8 is a flowchart of an exemplary process of a second example of determination.

FIG. 8 is a flowchart of an exemplary process of a second example of determination. This process is executed in step St7 described above. In the present example, the temperatures Ta and Tb of the FCs 4a and 4b are used to determine a possibility of flooding. As the temperatures Ta and Tb decrease, the amount of saturated vapor decreases. Thus, the liquid water in the FCs 4a and 4b increases, and flooding is likely to occur.

The ECU 2 causes the temperature sensors 45a and 45b to measure the temperatures Ta and Tb of the FCs 4a and 4b, respectively (step St31). Then, the ECU 2 compares the temperature Ta of the FC 4a with the temperature reference value Tref (step St32). When the temperature Ta is equal to or less than the temperature reference value Tref (step St32/No), the ECU 2 determines that there is a possibility of flooding (step St35). The temperature reference value Tref is determined through simulations or experiments based on various types of performance of the FCs 4a and 4b.

When the temperature Ta is higher than the temperature reference value Tref (step St32/Yes), the ECU 2 compares the temperature Tb of the FC 4b with the temperature reference value Tref (step St33). When the temperature Tb is equal to or less than the temperature reference value Tref (step St33/No), the ECU 2 determines that there is a possibility of flooding (step St35).

When the temperature Tb is higher than the temperature reference value Tref (step St33/Yes), the ECU 2 determines that there is no possibility of flooding (step St34). The process of the second example of determination is executed as described above.

As described above, when the temperature Ta measured by the temperature sensor 45a or the temperature Tb measured by the temperature sensor 45b is equal to or less than the temperature reference value Tref, the ECU 2 determines that there is a possibility of flooding due to the power generation of the FCs 4a and 4b. Thus, occurrence of flooding can be predicted with high accuracy based on the temperatures Ta and Tb.

Third Example of Determination

Figure 9:
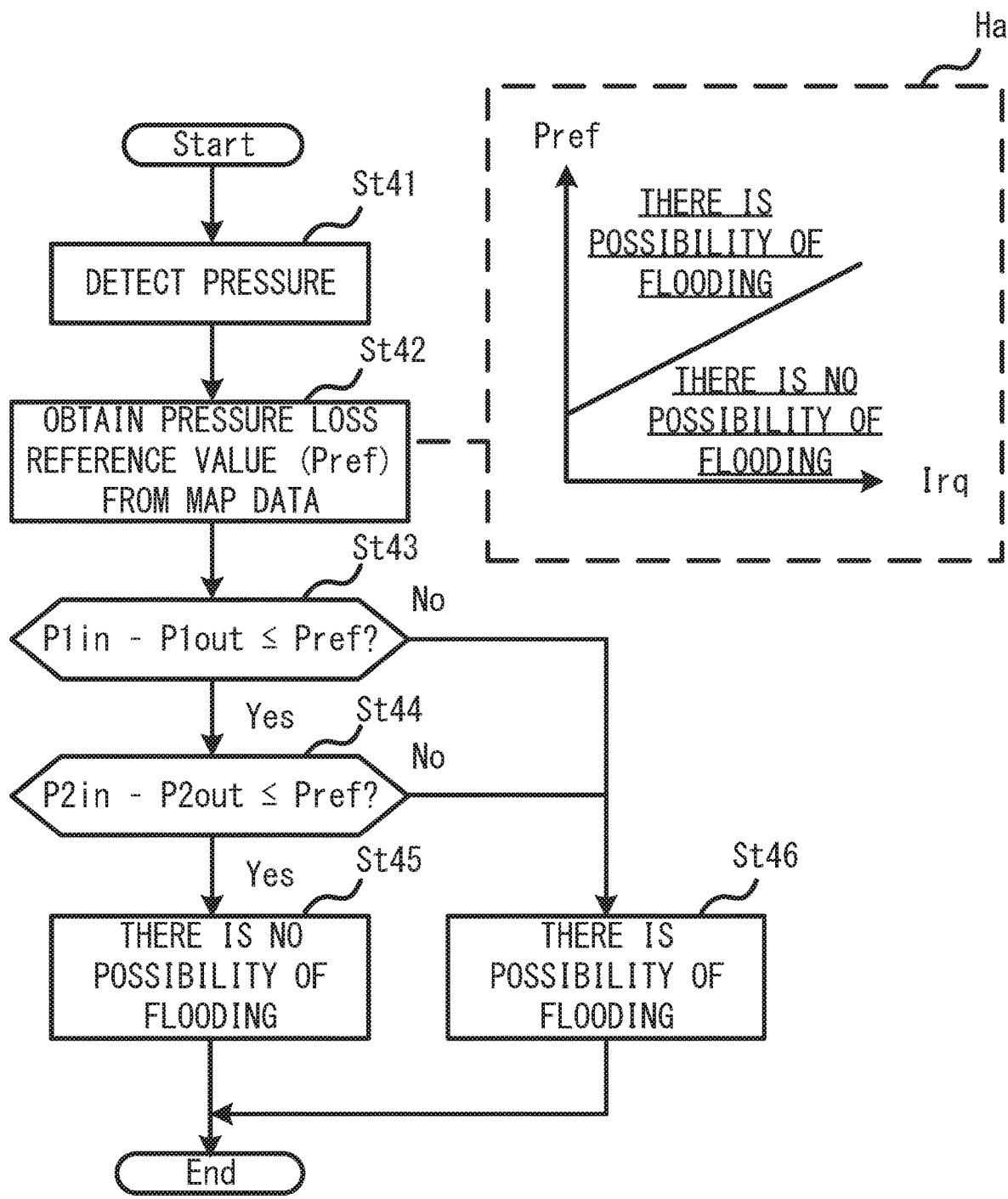
FIG. 9 is a flowchart of an exemplary process of a third example of determination.

FIG. 9 is a flowchart of an exemplary process of a third example of determination. This process is executed in step St7 described above. In this example, the pressure losses of the anode gas of the FCs 4a and 4b are used to determine a possibility of flooding.

The pressure loss in the FC 4a is calculated as the difference between the pressure detected by the inlet pressure sensor 21ap and the pressure detected by the outlet pressure sensor 23ap, while the pressure loss in the FC 4b is calculated as the difference between the pressure detected by the inlet pressure sensor 21bp and the pressure detected by the outlet pressure sensor 23bp. The inlet pressure sensors 21ap and 21bp and the outlet pressure sensors 23ap and 23bp are examples of first and second detection devices that detect the pressure loss of the anode gas.

The ECU 2 causes the inlet pressure sensors 21ap and 21bp and the outlet pressure sensors 23ap and 23bp to detect the pressure (step St41). Here, the pressures detected by the inlet pressure sensors 21ap and 21bp are represented by P1in and P2in, respectively, while the pressures detected by the outlet pressure sensors 23ap and 23bp are represented by P1out and P2out, respectively.

The ECU 2 then obtains the pressure loss reference value Pref according to the required current value Irq from, for example, map data stored in a memory (step St42). The reference character Ha indicates a relationship between the required current value Irq and the pressure loss reference value Pref. The pressure loss reference value Pref is a threshold value of the pressure loss for determining whether there is a possibility of flooding, and becomes higher as the required current value Irq becomes higher. The ECU 2 determines that there is a possibility of flooding when the pressure loss is higher than the pressure loss reference value Pref, and determines that there is no possibility of flooding when the pressure loss is lower than the pressure loss reference value Pref.

Then, the ECU 2 compares the pressure loss (P1in−P1out) in the FC 4a with the pressure loss reference value Pref (step St43). When the pressure loss is higher than the pressure loss reference value Pref (step St43/No), the ECU 2 determines that there is a possibility of flooding (step St46).

When the pressure loss is equal to or less than the pressure loss reference value Pref (step St43/Yes), the ECU 2 compares the pressure loss (P2in−P2out) in the FC 4b with the pressure loss reference value Pref (step St44). When the pressure loss is higher than the pressure loss reference value Pref (step St44/No), the ECU 2 determines that there is a possibility of flooding (step St46).

When the pressure loss is equal to or less than the pressure loss reference value Pref (step St44/Yes), the ECU 2 determines that there is no possibility of flooding (step St45). The process of the third example of determination is executed as described above.

As described above, the ECU 2 determines the pressure loss reference value Pref according to the required current values Irq of the FCs 4a and 4b. When the pressure loss detected in either one of the FCs 4a and 4b is greater than the pressure loss reference value Pref, the ECU 2 determines that there is a possibility of flooding due to the power generation of the FCs 4a and 4b. Thus, the ECU 2 can predict occurrence of flooding with high accuracy based on the required current value Irq and the pressure loss.

The above process can be applied to steps St13a and St13b described above. In this case, only the step corresponding to the FC 4a or 4b that continues power generation of steps St43 and St44 is executed. In addition, in step St42, the pressure loss reference value Pref according to the required current value Irq_a or Irq_b of the FC 4a or 4b that continues power generation is obtained.

Fourth Example of Determination

Figure 10:
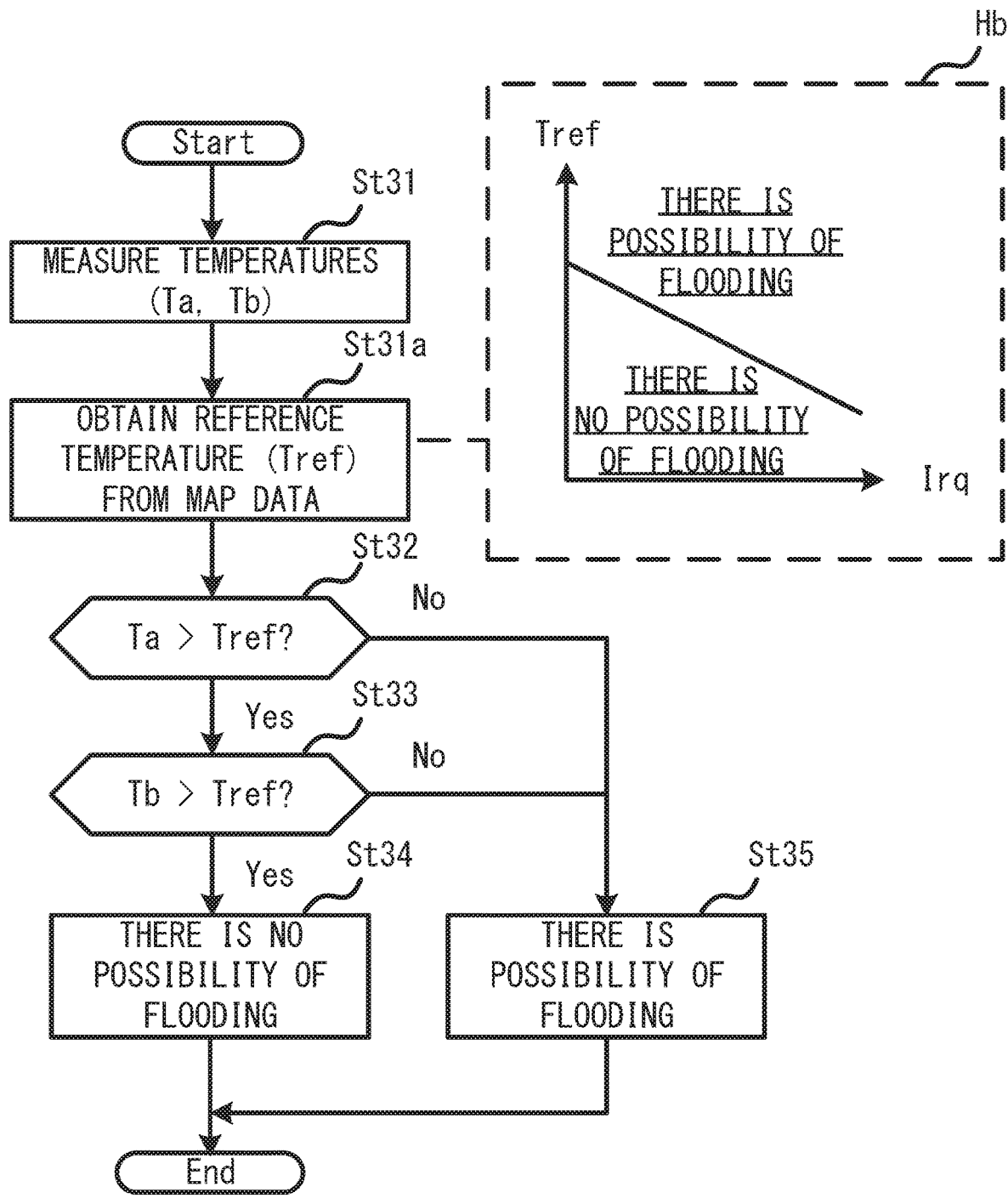
FIG. 10 is a flowchart of an exemplary process of a fourth example of determination.

FIG. 10 is a flowchart of an exemplary process of a fourth example of the determination. In FIG. 10, the same reference numerals are provided to the steps in common with those in FIG. 8, and the description thereof is omitted. This process is executed in step St7 described above.

In this example, as in the second example of determination, the temperatures Ta and Tb of the FCs 4a and 4b are used to determine a possibility of flooding, but the temperature reference value Tref is not a predetermined value, and is determined based on the required current value Irq.

The ECU 2 obtains the temperature reference value Tref according to the required current value Irq from, for example, map data stored in a memory (step St3a). The reference character Hb indicates an exemplary relationship between the required current value Irq and the temperature reference value Tref. The temperature reference value Tref is a threshold value of the temperatures Ta and Tb for determining whether there is a possibility of flooding, and increases as the required current value Irq increases. The ECU 2 determines that there is a possibility of flooding when the temperatures Ta and Tb are higher than the temperature reference value Tref, and determines that there is no possibility of flooding when the temperature Ta or Tb is less than the temperature reference value Tref.

As described above, since the ECU 2 determines the temperature reference value Tref according to the required current values Irq of the FCs 4a and 4b, the ECU 2 can predict occurrence of flooding with high accuracy based on the required current value Irq and the temperature.

The above process can be applied to steps St13a and St13b described above. In this case, only the step corresponding to the FC 4a or 4b that continues power generation of steps St32 and St33 is executed. In the step St31a, the temperature reference value Tref according to the required current value Irq_a or Irq_b of the FC 4a or 4b that continues power generation is obtained.

Fifth Example of Determination

Figure 11:
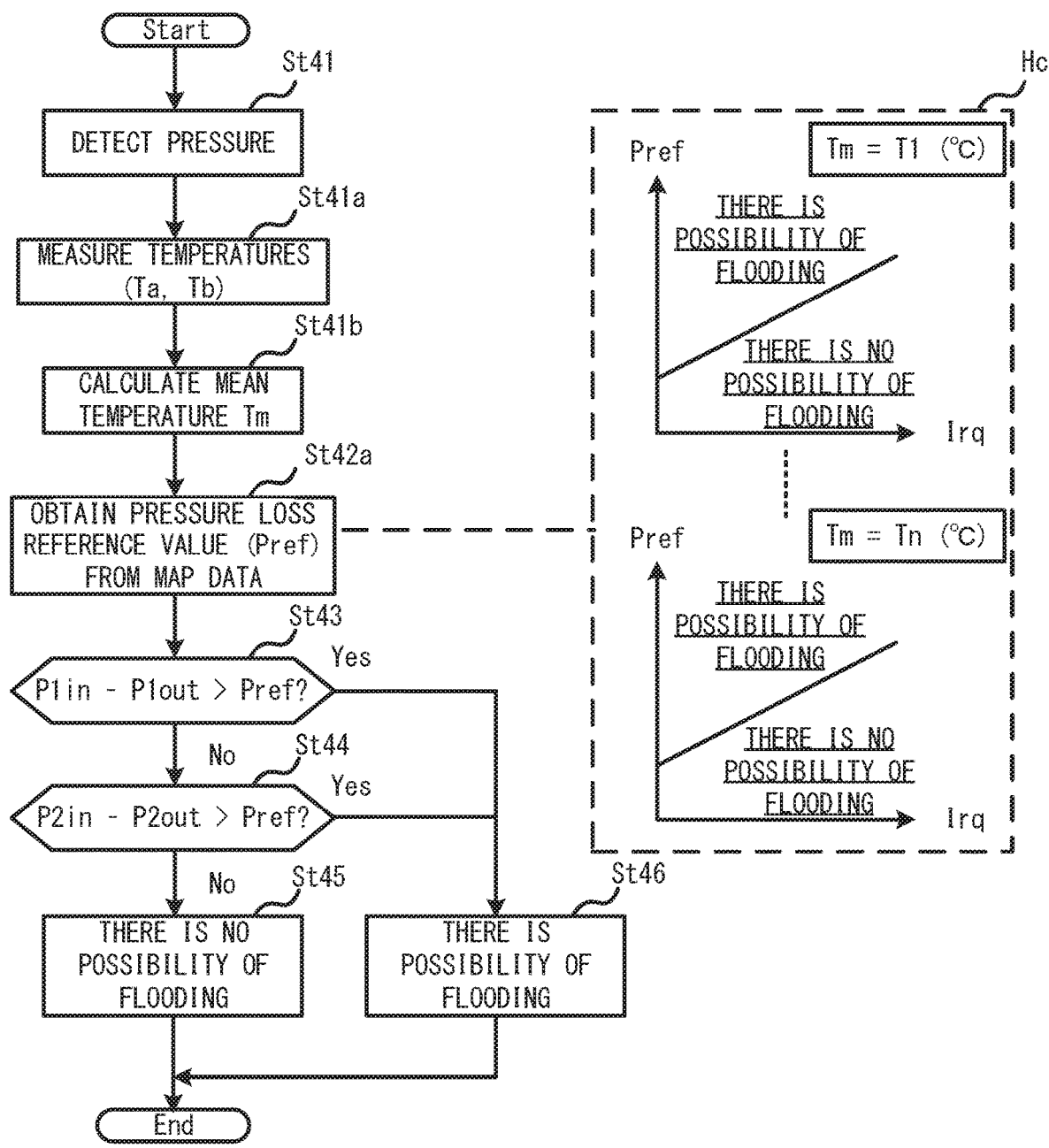
FIG. 11 is a flowchart of an exemplary process of a fifth example of determination.

FIG. 11 is a flowchart of an exemplary process of a fifth example of determination. In FIG. 11, the same reference numerals are provided to the steps in common with those in FIG. 9, and the description thereof is omitted. This process is executed in step St7 described above.

In this example, as in the third example of determination, the pressure losses of the anode gas of the FCs 4a and 4b are used to determine a possibility of flooding, but the pressure loss reference value Pref is determined based on not only the required current value Irq but also the temperatures Ta and Tb.

After the pressures are detected (step St41), the ECU 2 causes the temperature sensors 45a and 45b to measure the temperatures Ta and Tb of the FCs 4a and 4b, respectively (step St41a). Then, the ECU 2 calculates the mean temperature Tm of the temperatures Ta and Tb (step St41b).

Then, the ECU 2 obtains the pressure loss reference value Pref according to the required current value Irq and the mean temperature Tm from, for example, map data stored in a memory (step St42a). The reference character He indicates exemplary relationships between the required current value Irq and the pressure loss reference value Pref. The map data indicates the relationship between the required current value Irq and the pressure loss reference value Pref with respect to, for example, each mean temperature Tm=T1, T2, . . . , Tn (n: positive integer).

The pressure loss reference value Pref increases as the required current value Irq increases. The ECU 2 determines that there is a possibility of flooding when the pressure loss is higher than the pressure loss reference value Pref, and determines that there is no possibility of flooding when the pressure loss is lower than the pressure loss reference value Pref.

As described above, the ECU 2 determines the pressure loss reference value Pref according to the required current values Irq, the pressure losses, and the temperatures Ta and Tb of the FCs 4a and 4b. When the pressure loss detected in either one of the FCs 4a and 4b is greater than the pressure loss reference value Pref, the ECU 2 determines that there is a possibility of flooding due to the power generation of the FCs 4a and 4b. Thus, the ECU 2 can predict occurrence of flooding with high accuracy based on the required current value Irq, the pressure loss, and the temperatures Ta and Tb. In this example, the ECU 2 determines the pressure loss reference value Pref based on the mean temperature Tm, but this does not intend to suggest any limitation. The ECU 2 may determine the pressure loss reference value Pref by referring to one of the temperatures Ta and Tb.

The above process can be applied to steps St13a and St13b described above. In this case, only the step corresponding to the FC 4a or 4b that continues power generation of steps St43 and 44 is executed. In addition, in step St42a, the pressure loss reference value Pref according to the required current value Irq_a or Irq_b and the temperature Ta or Tb of the FC 4a or 4b that continues power generation is obtained. Step St41b is not executed.

Other Examples of the Fuel Cell System

The above describes a system including two FCs 4a and 4b, but the number of fuel cells in the system is not limited to two. As an example, the following will describe a system including three fuel cells.

Figure 12:
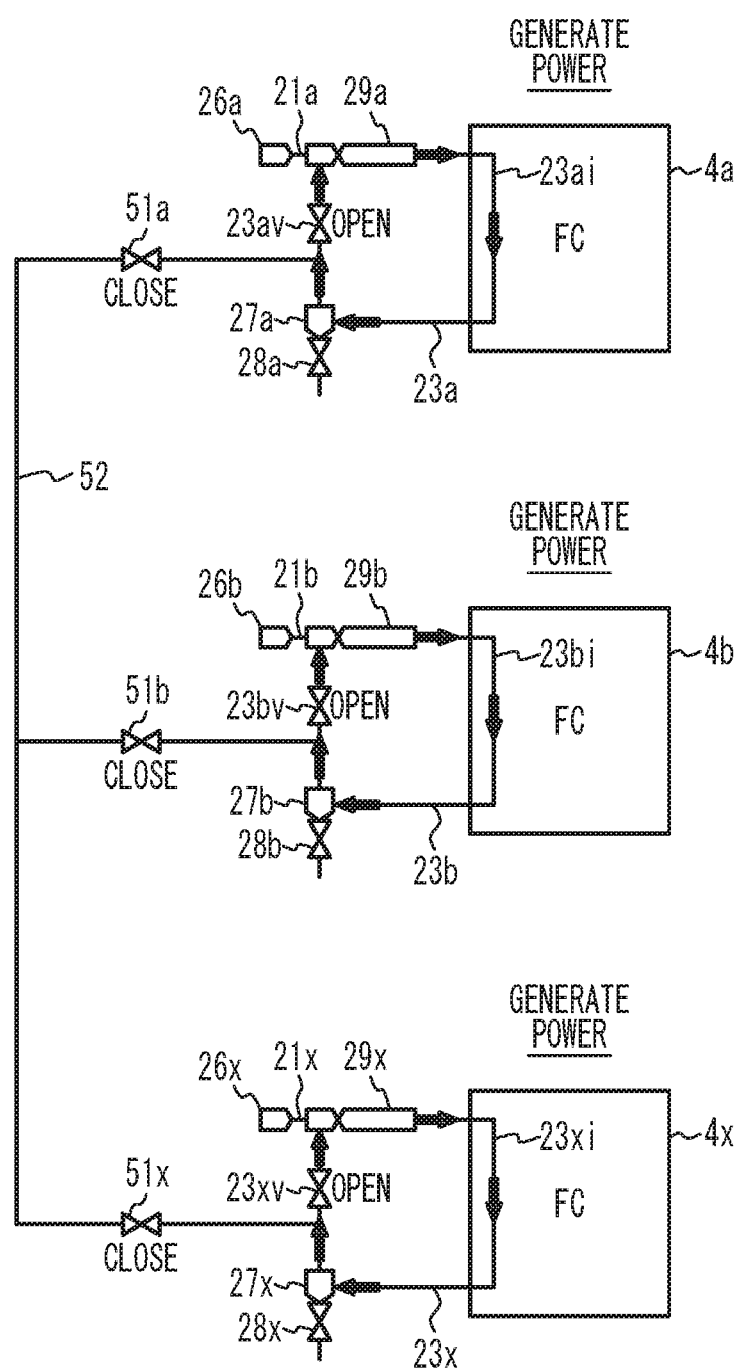
FIG. 12 illustrates an exemplary configuration of a fuel cell system including three fuel cells.

FIG. 12 illustrates an exemplary configuration of a fuel cell system including three FCs 4a, 4b, and 4x. In FIG. 12, the same reference numerals are provided to the components in common with those in FIG. 2A to FIG. 2C, and the description thereof is omitted.

The FC 4x is added, as an example of a third fuel cell, to the system 1 of this example. A supply pipe 21x and a return pipe 23x of the anode gas are connected to the FC 4x, as with other FCs 4a and 4b. An INJ 26x for injecting the anode gas and an ejector 29x for circulating the anode gas discharged from the FC 4x to the return pipe 23x, to the FC 4x are disposed in the supply pipe 21x. A shut valve 23xv, a gas-liquid separator 27x, and a discharge valve 28x are connected to the return pipe 23x. The INJ 26x is an example of a third fuel gas supply device that supplies the anode gas to the FC 4x, and the return pipe 23x is an example of a third circulation path that circulates the anode gas discharged from the FC 4x to the FC 4x.

An anode gas flow path 23xi through which the anode gas flows is disposed in the FC 4x. The illustration is omitted, but the FC 4x includes a cathode gas supply system and a cooling system as with the FCs 4a and 4b. The electric power control systems 30a and 30b and the motor 50 are connected to each of the FCs 4a, 4b, and 4x.

The respective return pipes 23a, 23b, and 23x of the FCs 4a, 4b, and 4x are connected to each other through a communication pipe 52. The communication pipe 52 is an example of a communication path, and is communicated with the return pipes 23a, 23b, and 23x. The communication pipe 52 diverges into three pipes, and the diverging pipes are connected to the return pipe 23a between the shut valve 23av and the gas-liquid separator 27a, to the return pipe 23b between the shut valve 23bv and the gas-liquid separator 27b, and to the return pipe 23x between the shut valve 23xv and the gas-liquid separator 27x.

In addition, selector valves 51a, 51b, and 51x are disposed in the diverging pipes of the communication pipe 52 to the FCs 4a, 4b, and 4x, respectively. For example, when the selector valves 51a and 51b are opened, the return pipes 23a and 23b of the FCs 4a and 4b are communicated with each other through the communication pipe 52, and when the selector valves 51b and 51x are opened, the return pipes 23b and 23x of the FCs 4b and 4x are communicated with each other through the communication pipe 52. The selector valves 51a, 51b, and 51x are examples of an opening/closing device, and causes the return pipes 23a, 23b, and 23x to be communicated with each other or to be disconnected from each other. In addition, the ECU 2 controls the selector valves 51a, 51b, and 51x, the INJ 26x, the shut valve 23xv, and the discharge valve 28x.

In this example, the FCs 4a, 4b, and 4x are generating electric power, and arrows indicate the direction in which the anode gas flows. In this case, the shut valves 23av, 23bv, and 23xv are opened, and the selector valves 51a, 51b, and 51x are closed. Thus, the anode gas circulates through the supply pipe 21a, the anode gas flow path 23ai, and the return pipe 23a, circulates through the supply pipe 21b, the anode gas flow path 23bi, and the return pipe 23b, and circulates through the supply pipe 21x, the anode gas flow path 23xi, and the return pipe 23x.

Figure 13:
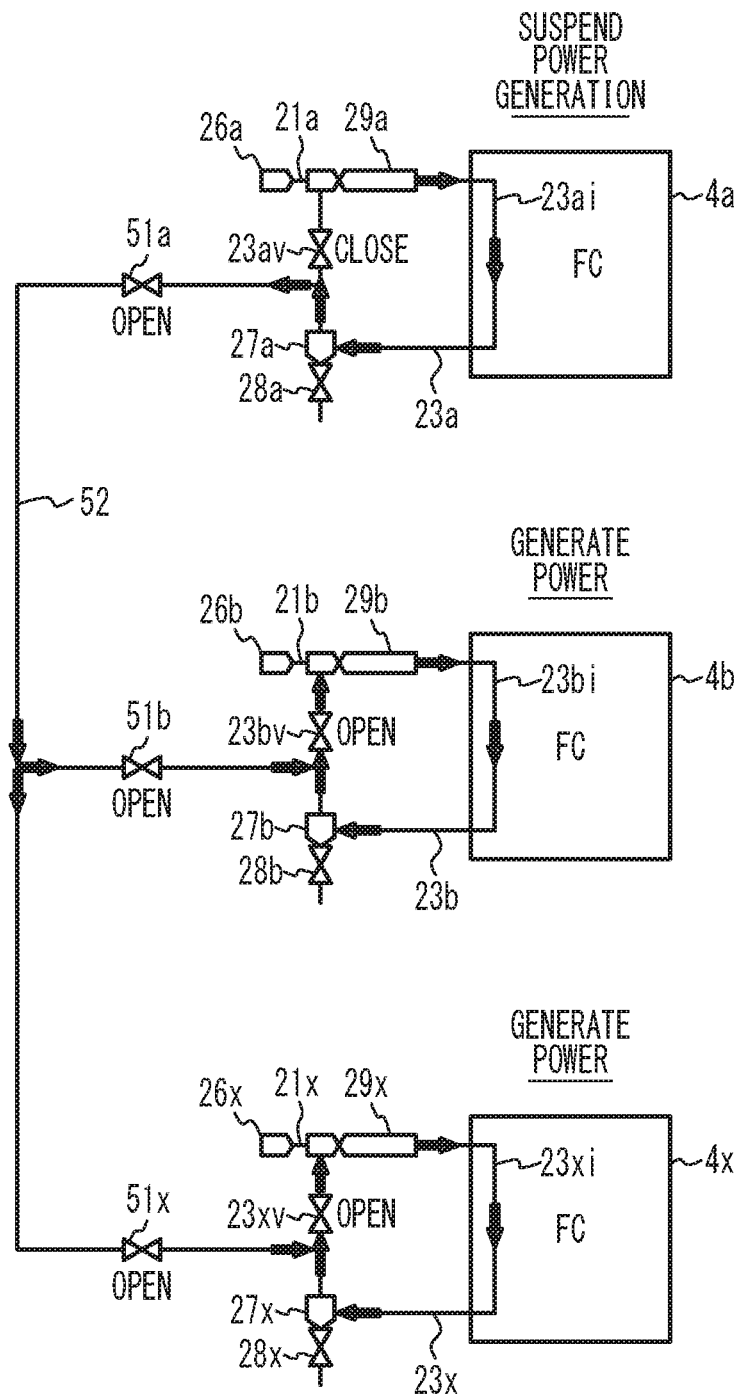
FIG. 13 illustrates a flow of the anode gas when power generation of one of the three fuel cells is suspended.

FIG. 13 illustrates a flow of the anode gas when the power generation of one of the FCs 4a, 4b, and 4x is suspended. The ECU 2 determines whether there is a possibility of flooding in the FCs 4a, 4b, and 4x due to the power generation of the FCs 4a, 4b, and 4x. When determining that there is a possibility of flooding in the FCs 4a, 4b, and 4x, the ECU 2 suspends the power generation of the FC 4a as an example while maintaining the supply of the anode gas. In this case, the ECU 2 suspends the power generation by, for example, stopping the supply of the cathode gas to the FC 4a. The ECU 2 maintains the supply of the cathode gas and the anode gas to the remaining FCs 4b and 4x.

In addition, the ECU 2 causes the return pipes 23a, 23b, and 23x to be communicated with each other through the communication pipe 52 by opening the selector valves 51a, 51b, and 51x, and stops the circulation of the anode gas through the return pipe 23a and the supply pipe 21a by closing the shut valve 23av. This control causes the anode gas flowing through the return pipe 23a to flow into the return pipes 23b and 23x of the FCs 4b and 4x through the communication pipe 52.

The FCs 4b and 4x increase the generated electric power using the anode gas flowing into the return pipes 23b and 23x, respectively. This compensates for the decline in generated electric power due to the suspension of the power generation of the FC 4a. In this case, the ECU 2 may increase the supply amounts of the cathode gas to the FCs 4b and 4x.

The above operation causes the liquid water in the return pipes 23b and 23x of the FCs 4b and 4x to be easily discharged due to the increase in the flow rate of the anode gas, thereby inhibiting occurrence of flooding in the FCs 4b and 4x. In addition, since the power generation of the FC 4a is suspended, liquid water is not produced. Thus, occurrence of flooding in the FC 4a is also inhibited.

Accordingly, the same advantages as the above are achieved also in the system 1 including three FCs 4a, 4b, and 4x as in this example. The present example describes a case where the power generation of the FC 4a is suspended, but occurrence of flooding is also inhibited by executing the similar operation to the above operation even when the power generation of the FC 4b or the FC 4x is suspended.

In this example, the ECU 2 suspends the power generation of one of the FCs 4a, 4b, and 4x, but may suspend the power generation of two of them according to, for example, the operation state of the system 1.

Figure 14:
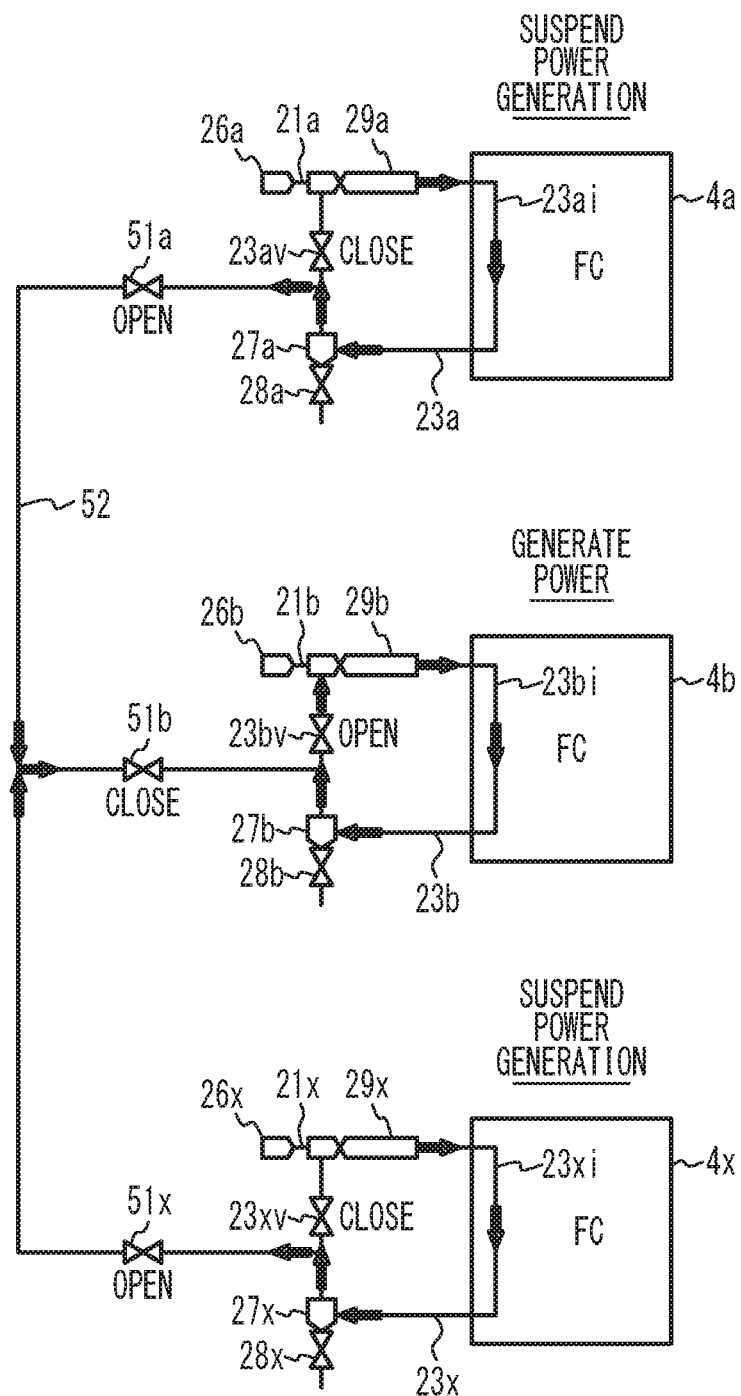
FIG. 14 illustrates a flow of the anode gas when power generation of two of the three fuel cells is suspended.

FIG. 14 illustrates a flow of the anode gas when the power generation of two of three FCs 4a, 4b, and 4x is suspended. When determining that there is a possibility of flooding in the FC 4a, 4b, and 4x, the ECU 2 suspends the power generation of the FCs 4a and 4x as an example while maintaining the supply of the anode gas. In this case, the ECU 2 suspends power generation by stopping, for example, the supply of the cathode gas to the FCs 4a and 4x. The ECU 2 maintains the supply of the cathode gas and the anode gas to the remaining FC 4b.

In addition, the ECU 2 causes the return pipes 23a, 23b, and 23x to be communicated with each other through the communication pipe 52 by opening the selector valves 51a, 51b, and 51x, and stops the circulation of the anode gas through the return pipes 23a and 23x and the supply pipes 21a and 21x by closing the shut valves 23av and 23xv. This control causes the anode gas flowing through the return pipes 23a and 23x to flow into the return pipe 23b of the FC 4b through the communication pipe 52.

The FC 4b increases the generated electric power using the anode gas flowing into the return pipe 23b. This compensates for the decline in generated electric power due to the suspension of the power generation of the FCs 4a and FC 4x. In this case, the ECU 2 may increase the supply amount of the cathode gas to the FC 4b.

The above operation causes the liquid water in the return pipe 23b of the FC 4b to be easily discharged due to the increase in the flow rate of the anode gas, thereby inhibiting occurrence of flooding in the FC 4b. Here, the flow rate of the anode gas in the return pipe 23b is greater than that in the example of FIG. 13 because the anode gas flows from the return pipes 23a and 23x of two FCs 4a and 4x, and liquid water is more effectively discharged. In addition, since the FCs 4a and the FC 4x suspend power generation, liquid water is not produced. Thus, occurrence of flooding in the FC 4a and the FC 4x is also inhibited.

Therefore, the same advantages as the above are achieved also in this example. The present example describes a case where the power generation of the FC 4a and the FC 4x is suspended, but even when the power generation of other two of the FCs 4a, 4b, and 4x is suspended, occurrence of flooding is inhibited by executing the similar operation to the above.

Although some embodiments of the present invention have been described in detail, the present invention is not limited to the specific embodiments but may be varied or changed within the scope of the present invention as claimed.

What is claimed is:

1. A fuel cell system comprising:
    a first fuel cell and a second fuel cell, each generating electric power using fuel gas and oxidant gas;
    a first fuel gas supply device that supplies the first fuel cell with the fuel gas;
    a second fuel gas supply device that supplies the second fuel cell with the fuel gas;
    a first circulation path that circulates the fuel gas discharged from the first fuel cell to the first fuel cell;
    a second circulation path that circulates the fuel gas discharged from the second fuel cell to the second fuel cell;
    a communication path that is communicated with the first circulation path and the second circulation path;
    an opening/closing device that causes the first circulation path and the second circulation path to be communicated with each other or to be disconnected from each other by opening/closing the communication path; and
    a controller configured to control the first fuel cell and the second fuel cell, the first fuel gas supply device and the second fuel gas supply device, and the opening/closing device,
    wherein the controller is configured to:
        determine whether there is a possibility of occurrence of flooding in the first fuel cell and the second fuel cell due to power generation of the first fuel cell and the second fuel cell, and
        when determining that there is the possibility of occurrence of flooding in the first fuel cell and the second fuel cell, suspend power generation of one of the first fuel cell and the second fuel cell while maintaining supply of the fuel gas, and cause the opening/closing device to make the first circulation path and the second circulation path be communicated with each other.

2. The fuel cell system according to claim 1, wherein when the power generation of the one of the first fuel cell and the second fuel cell is suspended, the other of the first fuel cell and the second fuel cell increases generated electric power by a decline in generated electric power due to suspension of the power generation of the one of the first fuel cell and the second fuel cell.

3. The fuel cell system according to claim 1, further comprising:
    a first oxidant gas supply device that supplies the first fuel cell with the oxidant gas; and
    a second oxidant gas supply device that supplies the second fuel cell with the oxidant gas,
    wherein the controller is configured to, when determining that there is the possibility of occurrence of flooding in the first fuel cell and the second fuel cell, cause an oxidant gas supply device, which supplies the oxidant gas to the other of the first fuel cell and the second fuel cell, of the first oxidant gas supply device and the second oxidant gas supply device to increase a supply amount of the oxidant gas.

4. The fuel cell system according to claim 3, wherein the controller is configured to, when determining that there is the possibility of occurrence of flooding in the first fuel cell and the second fuel cell, cause another oxidant gas supply device, which supplies the oxidant gas to the one of the first fuel cell and the second fuel cell, of the first oxidant gas supply device and the second oxidant gas supply device to reduce supply of the oxidant gas to suspend the power generation of the one of the first fuel cell and the second fuel cell.

5. The fuel cell system according to claim 1, further comprising:
    a first oxidant gas supply device that supplies the first fuel cell with the oxidant gas; and
    a second oxidant gas supply device that supplies the second fuel cell with the oxidant gas,
    wherein the controller is configured to, when determining that there is the possibility of occurrence of flooding in the first fuel cell and the second fuel cell, cause an oxidant gas supply device, which supplies the oxidant gas to the one of the first fuel cell and the second fuel cell, of the first oxidant gas supply device and the second oxidant gas supply device to reduce supply of the oxidant gas to suspend the power generation of the one of the first fuel cell and the second fuel cell.

6. The fuel cell system according to claim 1, further comprising:
    a first circulation valve that is disposed in the first circulation path on a downstream side of a part where the first circulation path and the communication path are connected to each other; and
    a second circulation valve that is disposed in the second circulation path on a downstream side of a part where the second circulation path and the communication path are connected to each other,
    wherein the controller is configured to close a circulation valve, which is disposed in a circulation path of the one of the first fuel cell and the second fuel cell, of the first circulation valve and the second circulation valve when causing the opening/closing device to make the first circulation path and the second circulation path be communicated with each other.

7. The fuel cell system according to claim 1, wherein the controller is configured to determine that there is a possibility of occurrence of flooding in the first fuel cell and the second fuel cell when an output current required of the first fuel cell and an output current required of the second fuel cell are less than a threshold value.

8. The fuel cell system according to claim 1, further comprising:
    a first measurement device that measures a temperature of the first fuel cell; and
    a second measurement device that measures a temperature of the second fuel cell,
    wherein the controller is configured to determine that there is the possibility of occurrence of flooding in the first fuel cell and the second fuel cell when the temperature measured by the first measurement device or the temperature measured by the second measurement device is equal to or less than a temperature reference value.

9. The fuel cell system according to claim 8, wherein the controller is configured to determine the temperature reference value according to an output current required of the first fuel cell and an output current required of the second fuel cell.

10. The fuel cell system according to claim 1, further comprising:
a first detection device that detects a pressure loss of the fuel gas flowing through the first fuel cell; and
a second detection device that detects a pressure loss of the fuel gas flowing through the second fuel cell,
wherein the controller is configured to determine a pressure reference value according to an output current required of the first fuel cell and an output current required of the second fuel cell, and when the pressure loss detected by the first detection device or the pressure loss detected by the second detection device is greater than the pressure reference value, determine that there is a possibility of occurrence of flooding in the first fuel cell and the second fuel cell.

11. The fuel cell system according to claim 10, further comprising:
a first measurement device that measures a temperature of the first fuel cell; and
a second measurement device that measures a temperature of the second fuel cell,
wherein the controller is configured to determine the pressure reference value according to the temperature measured by the first measurement device or the temperature measured by the second measurement device, and the output current.

12. The fuel cell system according to claim 1, wherein the controller is configured to suspend power generation of a fuel cell of which an accumulated power generation time is longer of the first fuel cell and the second fuel cell when determining that there is the possibility of occurrence of flooding in the first fuel cell and the second fuel cell.

13. The fuel cell system according to claim 1, wherein the controller is configured to:
determine whether there is the possibility of occurrence of flooding in the other of the first fuel cell and the second fuel cell when the other of the first fuel cell and the second fuel cell is to generate electric power while the power generation of the one of the first fuel cell and the second fuel cell is suspended, and
when there is no possibility of occurrence of flooding in the other of the first fuel cell and the second fuel cell, suspend the power generation of the one of the first fuel cell and the second fuel cell.

14. The fuel cell system according to claim 1, wherein when there is the possibility of occurrence of flooding in the other of the first fuel cell and the second fuel cell, the first fuel gas supply device and the second fuel gas supply device are caused to increase a supply amount of the fuel gas.

15. The fuel cell system according to claim 1, further comprising:
a first ejector that is connected to the first circulation path, and guides the fuel gas discharged from the first fuel cell to the first fuel cell together with the fuel gas supplied from the first fuel gas supply device; and
a second ejector that is connected to the second circulation path, and guides the fuel gas discharged from the second fuel cell to the second fuel cell together with the fuel gas supplied from the second fuel gas supply device.

16. The fuel cell system according to claim 1, further comprising:
a third fuel cell that generates electric power using the fuel gas and the oxidant gas;
a third fuel gas supply device that supplies the third fuel cell with the fuel gas; and
a third circulation path that circulates the fuel gas discharged from the third fuel cell to the third fuel cell,
wherein the communication path is communicated with the first circulation path, the second circulation path, and the third circulation path,
wherein the opening/closing device causes the first circulation path, the second circulation path, and the third circulation path to be communicated with each other or to be disconnected from each other, and
wherein the controller is configured to:
determine whether there is a possibility of occurrence of flooding in the first fuel cell, the second fuel cell, and the third fuel cell due to power generation of the first fuel cell, the second fuel cell, and the third fuel cell,
when determining that there is the possibility of occurrence of flooding in the first fuel cell, the second fuel cell, and the third fuel cell, suspend the power generation of the one of the first fuel cell and the second fuel cell among the first fuel cell, the second fuel cell, and the third fuel cell while maintaining supply of the fuel gas, and cause the first circulation path, the second circulation path, and the third circulation path to be communicated with each other.

17. The fuel cell system according to claim 16, wherein the controller is configured to, when determining that there is the possibility of occurrence of flooding in the first fuel cell, the second fuel cell, and the third fuel cell, suspend the power generation of the one of the first fuel cell and the second fuel cell and power generation of the third fuel cell while maintaining supply of the fuel gas, and cause the first circulation path, the second circulation path, and the third circulation path to be communicated with each other.

* * * * *